US005953426A

United States Patent [19]

Windel et al.

[11] Patent Number: 5,953,426

[45] Date of Patent: Sep. 14, 1999

[54] METHOD AND ARRANGEMENT FOR GENERATING AND CHECKING A SECURITY IMPRINT

[75] Inventors: Harald Windel; Wolfgang Thiel; Andreas Wagner, all of Berlin, Germany

[73] Assignee: Francotyp-Postalia AG & Co., Birkenwerder, Germany

[21] Appl. No.: 08/798,604

[22] Filed: Feb. 11, 1997

[51] Int. Cl.[6] ................................ H04L 9/00; H04L 9/06; G07B 17/02

[52] U.S. Cl. ............................ 380/51; 705/401; 705/405; 380/9; 380/21; 380/23; 380/25; 380/49; 380/55

[58] Field of Search ..................................... 705/401, 405, 705/406, 410; 380/2, 9, 49, 50, 51, 54, 55, 59, 23, 24, 25, 29, 21

[56] References Cited

U.S. PATENT DOCUMENTS

| | | | |
|---|---|---|---|
| 4,461,028 | 7/1984 | Okubo . | |
| 4,580,144 | 4/1986 | Calvi . | |
| 4,660,221 | 4/1987 | Dlugos . | |
| 4,725,718 | 2/1988 | Sansome et al. . | |
| 4,746,234 | 5/1988 | Harry . | |
| 4,757,537 | 7/1988 | Edelmann et al. . | |
| 4,760,532 | 7/1988 | Sansome et al. . | |
| 4,775,246 | 10/1988 | Edelmann et al. . | |
| 4,812,965 | 3/1989 | Taylor . | |
| 4,829,568 | 5/1989 | Clark et al. . | |
| 4,831,555 | 5/1989 | Sansone et al. . | |
| 4,933,849 | 6/1990 | Connell et al. . | |
| 4,934,846 | 6/1990 | Gilham . | |
| 4,949,381 | 8/1990 | Pastor . | |
| 5,075,862 | 12/1991 | Doeberl et al. . | |
| 5,186,498 | 2/1993 | Dietrich . | |
| 5,233,657 | 8/1993 | Güenther . | |
| 5,280,531 | 1/1994 | Hunter . | |
| 5,293,319 | 3/1994 | DeSha et al. . | |
| 5,390,251 | 2/1995 | Pastor et al. | 380/51 X |
| 5,457,642 | 10/1995 | Brookner . | |
| 5,666,421 | 9/1997 | Pastor et al. | 380/51 |
| 5,805,711 | 9/1998 | Windel et al. | 380/55 |
| 5,812,401 | 9/1998 | Moore | 705/410 |

FOREIGN PATENT DOCUMENTS

| | | |
|---|---|---|
| 0 060 225 | 9/1982 | European Pat. Off. . |
| 2 188 880 | 10/1987 | United Kingdom . |
| 2 211 144 | 6/1989 | United Kingdom . |

*Primary Examiner*—Bernarr E. Gregory
*Attorney, Agent, or Firm*—Hill & Simpson

[57] ABSTRACT

A method for checking a security imprint in a postage meter machine having a microprocessor includes the steps of encoding data for a security mark pixel image and inserts the encoded data into the remaining, fixed and variable pixel image data during printing. The method includes steps for forming a mark symbol sequence from an encoded combination number which is composed of at least a first number (sum of all postage values since the last reloading date), an optional second number added to said first number, a third number (postage value) and a fourth number (of the serial number), and for enabling a check of the security imprint by a postal authority. Manipulations can be recognized using further data stored and/or calculated in a remote data center. An arrangement conducting a for check includes a mark reader composed of a CCD line camera, a D/A converter, a comparator and an encoder which are connected via an input/output unit to an input unit. A communication link can be established between the meter and the data center to evaluate mark data in a computerized manner.

1 Claim, 22 Drawing Sheets

*FIG. 3F*

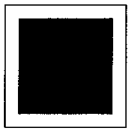

1st SYMBOL "SQUARE"
DEGREE OF BLACKENING
100%

*FIG. 3G*

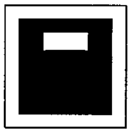

2nd SYMBOL "DOOR"
DEGREE OF BLACKENING
90.1%

*FIG. 3H*

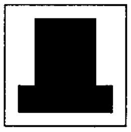

3rd SYMBOL "HAT"
DEGREE OF BLACKENING
79.6%

*FIG. 3I*

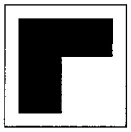

4th SYMBOL "ANGLE"
DEGREE OF BLACKENING
71.4%

*FIG. 3J*

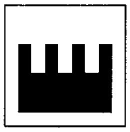

5th SYMBOL "CROWN"
DEGREE OF BLACKENING
59.2%

*FIG. 3K*

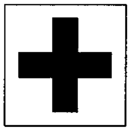

6th SYMBOL "CROSS"
DEGREE OF BLACKENING
49.0%

*FIG. 3L*

7th SYMBOL "LADDER"
DEGREE OF BLACKENING
40.8%

*FIG. 3M*

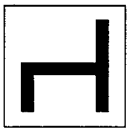

8th SYMBOL "CHAIR"
DEGREE OF BLACKENING
29.6%

*FIG. 3N*

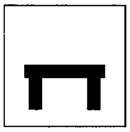

9th SYMBOL "TABLE"
DEGREE OF BLACKENING
20.4%

*FIG. 3O*

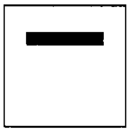

10th SYMBOL "BAR"
DEGREE OF BLACKENING
10.2%

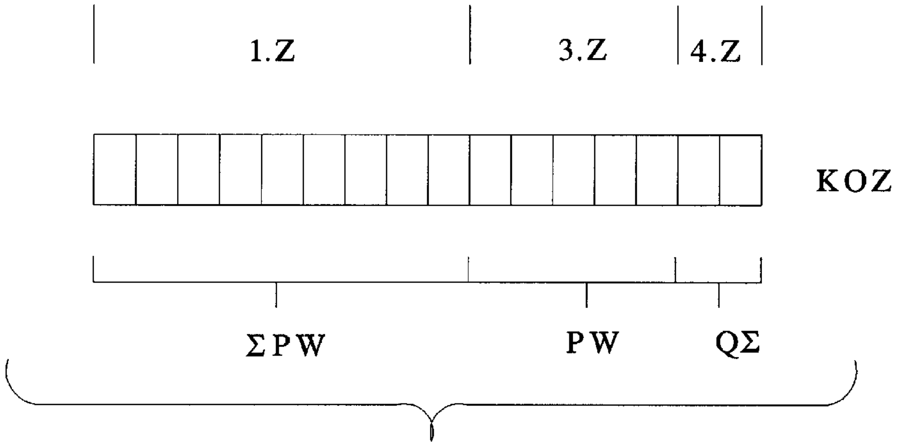
FIG. 4A
FIG. 4B
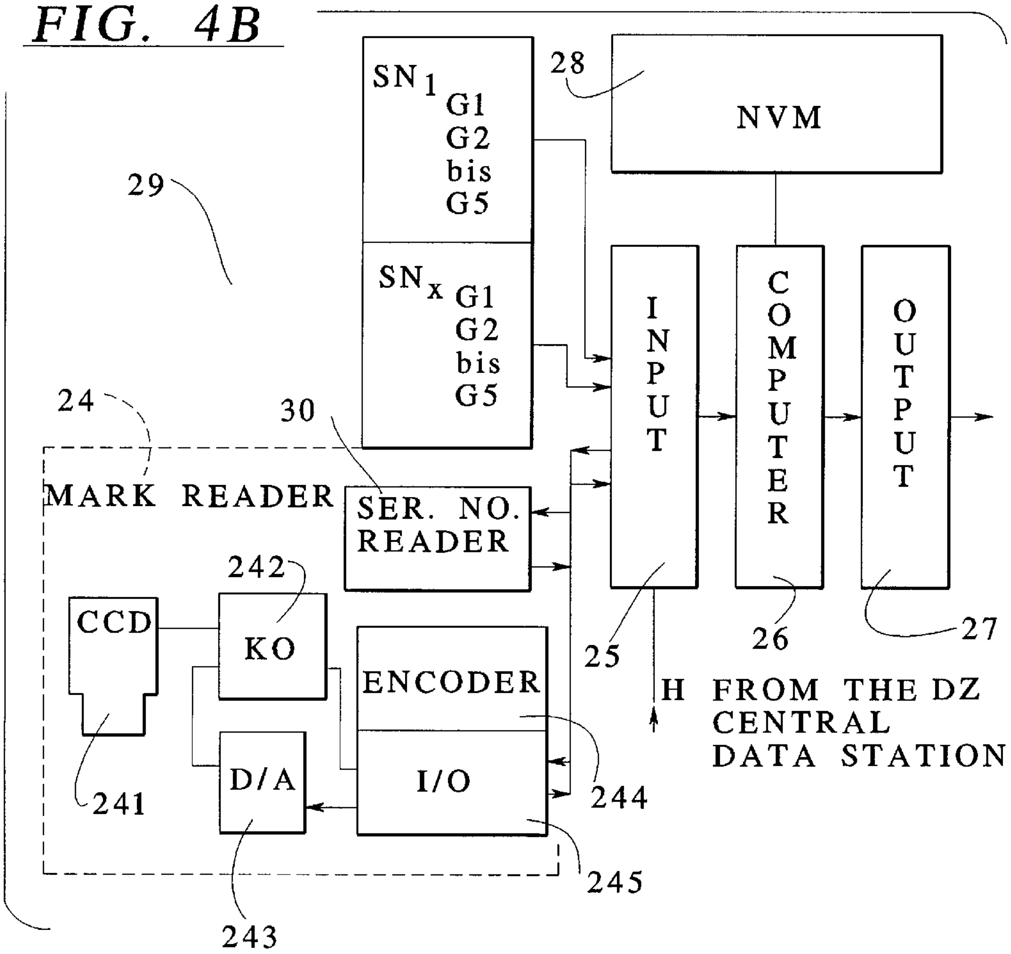

$Z_1$: TARGET ADDRESS FOR RAM 7c IN THE RAM 7b FOR FIRST WINDOW $T_1$: WINDOW COLUMN VARIABLE IN THE RAM 7b FOR FIRST WINDOW $Y_1$: WINDOW COLUMN RUNLENGTH OF THE FIRST WINDOW= const.

METHOD AND ARRANGEMENT FOR GENERATING AND CHECKING A SECURITY IMPRINT

BACKGROUND OF THE INVENTION

1. Field of the Invention

The present invention is directed to a method for generating and checking a security imprint arrangement for implementing the method.

The invention is particularly directed to postage meter machines that deliver a completely electronically produced imprint for franking postal matter including the printing of an advertising slogan and a mark. The postage meter machine is equipped with at least one input means, an output means, and input/output control module, memory means, control means and a printer module.

2. Description of the Prior Art

A postage meter machine usually produces an imprint at the flush right, parallel to the upper edge of postal matter in a form agreed upon with the post office, beginning with the content of the postage value in the franking, the data in the postmark and imprints for advertising slogan, and possibly an identification of the type of mailing in the selective imprint. The postage value, the date and the type of mailing form variable information which is to be entered according to the item mailed.

The postage value is usually the delivery fee (franking) prepaid by the sender that is taken from a refillable credit register and is employed for prepaying the mailing.

The date is the current date, or a future date in a postmark. Whereas the current date is automatically offered by a clockidate module, a setting of a desired future date must be undertaken by a manual pre-dating. Pre-dating is of interest in all instances wherein the volume of postal matter must be handled and franked in an extremely timely fashion but must be sent by a specific deadline. Embedding the variable data for the date in the postmark can be fundamentally undertaken in the same way as the imprint of the postage value.

The approved advertising slogans can contain a large variety of types of messages, particularly the address, the company logo, the post office box and/or any other desired message. The advertising slogan is an additional inclusion that must be agreed upon with the postal authorities.

U.S. Pat. No. 4,580,144 discloses an electronic franking unit having two thermal printing devices, whereby the fixed part of the print format (postal authority mark and image frame) is printed by the first device and the variable part of the print format (postage and date) is printed by the second device, the parts being printed in succession. The printing speed can be increased as a result of this division and separate handling of the variable and constant data. A security imprint, however, is not created, however, because of the lack of a “fingerprint”.

German OS 38 23 719 discloses a security system having a character printing authorization means. A computer in the postage meter machine has a memory into which data for a modification in graphics can be loaded and which also contains data corresponding to the date allocated to the modification. When the user requests a change in financial resources, the computer of the postage meter machine accesses an external dialing means via a connecting device (modem) that undertakes a selection of a character pattern to be printed. A disadvantage of this known system is that the user of the postage meter machine is not given any freedom for selecting the character pattern. The printed character pattern is employed for checking the security of the authorization of the postage meter machine. The entire, printed print format including that special character pattern must be evaluated by the postal authority, which is possible only with high outlay.

It has been proposed to apply certain hidden or encoded characters, barcodes, in the postage machine imprint on the postal matter with a plurality of printer heads as visible or invisible marks in order to be able to identify forgeries.

The apparatus disclosed in U.S. Pat. No. 4,775,246, thus, an alphanumerical number is additionally printed in the postmark and, in the apparatus disclosed in U.S. Pat. No. 4,649,266, an individual, alphanumerical digit is additionally co-printed in a number in the postmark, but subjective errors are not precluded when post office employees compare such digits or numbers. U.S. Pat. No. 4,934,846, by contrast, discloses a machine-readable barcode printed in a separate field next to the imprint of the postage value; this, however, disadvantageously diminishes the available printing area for the postmark and/or for the advertising slogan.

Applying such a barcode with a separate printer is disclosed in U.S. Pat. No. 4,660,221 and in U.S. Pat. No. 4,829,565, whereby a character having transposed or offset elements is also printed in the latter patent, the mismatch or offset thereof containing the relevant security information. The printer device is supplied in alternation with variable data from a memory means and with data from an encoding circuit, by a selection means. Alphanumerical characters having regions (speckles) mixed therein are produced in the field provided for the variable data and are printed on the print medium. According to U.S. Pat. No. 4,641,346, the evaluation ensues by reading such a character column-by-column and making a column-by-column comparison with stored characters in order to reacquire the security information. The data derived from the encoding circuit are thereby in turn separated, a further means being required for this purpose. The evaluation is correspondingly complicated and can only be accomplished with complicated apparatus and with qualified postal employees.

An apparatus for batch postal processing disclosed in U.S. Pat. No. 4,760,532 wherein each mailing item need not be individually franked but, instead, a postage fee is printed in a secured printing pass and an additional pass which is unsecured is implemented to print a postal area code on the postal matter in barcode format. Work can thereby be carried out with a fast, relatively inexpensive unsecured printer, with which the recipient address is also printed. When there is proof of a manipulation performed at the billing unit of the service apparatus, an incorrect postal area code is printer in barcode form. The data listed on the pass with a secured printed regarding the stack of mail are simultaneously electronically communicated from the service apparatus to the central station after the processing of each stack. As needed, a comparison of the data printed on the pass can be undertaken in the post office to the data electronically stored in the central station when a mailing identified as being manipulated is identified. An invalid, manipulated mailing identified in this way, however, can only be sorted out in the post office if all of the mail in the post office is constantly checked. Measured relative to the result, this outlay is far too high, particularly since only a manipulation at the service apparatus, but not other types of manipulations performed on the mail on the way to the post office, can thus be identified.

European Application 540 291 discloses an apparatus for the analysis of postal meter use for detecting counterfeiting that is based on a re-calculation system. The functioning of the system is likewise in turn dependent on scanning the entire stream of mail. The individual, franked values are scanned, summed and then compared to the re-loaded credit for the corresponding postage meter machine. Although data are entered automatically in this system with an OCR (optical character recognition) reader and a complicated calculating technique is utilized, this type of data acquisition is relatively uncertain and too slow for a post office, particularly since all of the mail would have to be evaluated in this way.

The printing of encrypted data ensues in the address field according to U.S. Pat. No. 4,725,718. For evaluation, it is likewise known to undertake a comparison of cleartext data to the encrypted presentation of the data utilizing the address data. Although a relatively large amount of space is used in the address field for the encrypted data and the generation of the encrypted data is complicated and must ensue using a specific encoding module, this system is not completely resistant to counterfeiting because an encrypted text composed of the segments is generated from the individual output data that are related to the aforementioned segments which could be discovered on the basis of long-term observation. This is also true even if this imprint ensues as a barcode or in some other machine-readable form. This solution is unsuitable for postage meter machines without address imprinting, since no incorporation of the address data into the encoding is possible. Postage meter machines that are already in operation and have a non-mechanical printing principle cannot be employed in order to generate a mark for a security imprint because of the additional, specific encoding module that is required. Finally, the problem remains unresolved of the presentation of additional information requiring a comparatively large amount of space, particularly in the form of a barcode.

Since the presentation of relevant information in the form of a barcode requires a relatively large amount of space, a two-dimensional barcode has likewise been proposed. A remaining disadvantage, however, is that barcodes can only be machine-checked, i.e. they cannot be additionally manually checked. A security system disclosed in U.S. Pat. No. 4,949,381 employs imprints in the form of bitmaps in a separate marking field under the imprint of the postage meter machine. Even though the bitmaps are especially tightly packed, the height of the stamped image is reduced by the height of the marking field due to the size of the marking field that is still required. Too much of the area required for an advertising slogan is thus lost. The high-resolution recognition means required for evaluating the mark is also disadvantageous.

Another security system employs imprints in the form of a diagram (U.S. Pat. No. 5,075,862) within the stamped imprint of the postage meter machine. When, however, individual printer elements are down, dots in the print format are missing, this potentially leading to a signaling of an alleged forgery. Such marks in diagram form within the stamped imprint of the postage meter machine are therefore not reliable. Even given a faultless imprint, the machine reading is made more difficult since the entire print format must always be evaluated.

Further, German OS 40 03 006 discloses a method for analyzing the printed imprint postal matter in order to enable an identification of the postage meter machine, which made the imprint whereby a multi-place cryptographic number is formed incorporating the date, machine parameters, the postage value and the advertising slogan, and is separately intermediately stored. The cryptographic number is additionally inserted into the printed pattern during printing via a printer control that sets the printer means. A forgery or any imitation of the stamp of the postage meter machine by an imprint of a postage value that has not been accounted for can be recognized based on the cryptographic number. That user who manipulated the postage value can easily be detected even given a plurality of users of a single postage meter machine. This approach, however, does not permit the use of a fully electronically produced print format for an impact-less printer, nor can such a print format be electronically evaluated in a simple way.

For security-orientated reasons, it has been proposed in German OS 40 34 292, in a fully electronically produced print format, to store only a constant part of the franking image in the postage meter machine and to send the other, associated variable part to the postage meter machine from the central data station in order to compose the ultimate print format. The fully electronically produced advertising slogan in this solution, however, likewise forms part of the constant data of the franking image, as does the frame arrangement of the value and the postmark with an indication of locating and, possibly, the zip code.

A communication of the terminal equipment containing a franking module with a central data station is thus necessary for compiling the print data for every franking. The printing is thereby delayed, making this solution unsuitable for bulk franking of a large quantity of postal matter.

In a postage meter machine disclosed in U.S. Pat. No. 4,746,234, fixed and variable data sets are stored in memory means (ROM, RAM), the date being read out with a microprocessor when a letter actuates a microswitch on the conveying path preceding the printing position and in order to form a print control signal. These two data sets are subsequently electronically combined for form a print format and can be printed out with a thermal printing means on an envelope to be franked. Given a large number of variable data, the formation of the print control signal is correspondingly delayed. The maximum printing speed that can be achieved given unaltered postal data is limited, in particular, by the time required in the formation of the print control signal. An additional material outlay would have to be expended or the reduction of the printing speed would have to be accepted when a cryptographic number is to be calculated from the data in order to generate a mark for a security imprint therefrom. In both instances, lack of acceptance by customers must ultimately be anticipated for such a machine (high price and/or too slow).

The advantage of such a mark is that a franking stamp printed by a postage meter machine cannot be altered by a manipulator without a corresponding alteration of the mark, since a franking stamp modified with fraudulent intent, resulting in an inapplicable mark, can be recognized. It would still be necessary, however, to identify the manipulated postage meter machine whose function had been tampered with.

U.S. Pat. No. 4,812,965 discloses a remote inspection system for postage meter machines that is based on specific messages in the imprint on mailings that must be sent to the central data station. Sensors within the postage meter machine are intended to detect any falsification action that was undertaken so that a flag can be set in designated memories if the postage meter machine is tampered with for manipulative purposes. Such tampering could ensue in order to load an unpaid credit into the register. A disadvantage, such a system cannot prevent a knowledgeable manipulator who breaks into the postage meter machine from subsequently eliminating evidence of the tampering, by erasing the flags. Further, this cannot prevent the imprint itself from being manipulated, even though it is produced by a properly operated machine. There is the possibility in known machines of producing imprints with the postage value of zero. Such zero frankings are required for testing purposes and could be falsified in that a postage value greater than zero is simulated.

SUMMARY OF THE INVENTION

It is an object of the present invention to overcome the disadvantages of the prior art and to achieve a significant enhancement of security in a printing apparatus without the necessity of conducting an unscheduled inspection on site.

A further object is an evaluation to be made as to whether a manipulation was undertaken upon mailing or at a postage meter machine in an uncomplicated way with a security imprint.

The above objects are achieved in an arrangement for generating and checking a security imprint, such as a postage meter machine constructed in accordance with the principles of the present invention having a microprocessor in a control means which implements an encoding for pixel image data of a mark and inserts the encoded data into the other fixed and variable pixel image data during printing. The above objects are also achieved in a method including the steps of forming a sequence of mark symbols from an encoded combination number that is composed of a first number, with a second number possibly appended thereto (sum of all postage values since the last reloading date), a third number (postage value) and a fourth number (from the series number), and checking the security imprint in a post office, and recognizing manipulations by the incorporation of further data stored and/or calculated in the central data station. An arrangement for checking includes a mark reader composed of a CCD line camera, a D/A converter, a comparator and an encoder which are connected to an input means via an input/output unit. The input means is connected to the central data station in order to evaluate mark data with a computer, a memory and output means.

A first version of the check of a security imprint having a mark symbol sequence begins with a communication of data from the central data station to the postal authority with respect to those postage meter machines that have not loaded any credit for a longer time, or that have not reported to the central data station, and therefore seem suspicious.

The solution of the invention is based on the perception that only central data stationarily stored in a central data station can be adequately protected against a manipulation. Corresponding register values are interrogated in a communication, for example within a telesetting of a reloaded credit.

The input credit amounts summed in the postage meter machine are ultimately used during franking. The average inflow of credit is compared to the outflow of credit (use of postage) by the central data station in a calculation in order to analyze the previous use of the postage meter machine and in order to predict future user behavior.

The postage meter machine that receives a regular reloading of credit or that regularly reports to a central data station can thereby be classified as being not suspicious. The postage meter machine that continues to operate beyond a predicted reloading date without reloading, however, need not necessarily have been manipulated. For example, the volume of mail to be handled by the postage meter machine may have diminished more than average. When adequate credit remains available in the postage meter machine, a user, of course, must thus be permitted to continue to frank. Only an unscheduled inspection on site could clarify in this case whether a manipulation has occurred. A postage meter machine user having an irregular franking and credit reloading behavior could postpone this inspection by reporting to the central data station as soon as the user receives a notification that the postage meter machine is considered suspicious. The central data station then undertakes a remote inspection. It is inventively proposed for security to implement both measures, i.e. a remote inspection of the postage meter machine by the central data station and a check of the mailings in the post office or an authorized institution.

The invention is based on the consideration that that user who has manipulated must either subject himself to increased outlay when he attempts to cancel his manipulation in order to report to the central data station on time, this central data station interrogating the register values, or that he would only report irregularly or not at all. It is simultaneously provided to render an operation on the postage meter machine function for manipulative purposes as difficult as possible on the basis of the security structure of the postage meter machine, using sensor and detector means. One thus succeeds in achieving a significant enhancement in security without an unscheduled inspection on site. Additionally, a security imprint with separate regions for a mark information is made on the postal matter by the postage meter machine. Inspection of the postage meter machine on site can be replaced by the check of a mark symbol sequence by an authorized office, preferably at the post office. A direct inspection of the postage meter machine on site would then only have to be undertaken by an inspector or by a person authorized to carry out an on site inspection in well-founded cases (manipulation).

Since only one separate region exclusively containing the mark information is to be evaluated, the postal authority can distinguish between a postage meter machine imprint manipulated with fraudulent intent and unmanipulated postage meter machine imprints in an uncomplicated way. An evaluation is easily possible with the symbol sequence employed as mark information, even for an imprint that was imitated by a manipulator or for a machine that was manipulated, as well as for a machine which was continued to be operated by the user beyond the remote inspection date.

In its compressed presentation, the mark symbol sequence co-printed for security purposes is based on an encoded combination number whose places (digits) are predetermined for an allocation of evaluatable quantities. A mark symbol sequence can be generated via a routine by the microprocessor of the postage meter machine without employing an additional cryptographic circuit. Different versions of mark information that can be reacquired from a mark symbol sequence are thereby possible.

A monotonously, steadily variable quantity is used in addition to the actual postage value to be checked that forms the one quantity. A specific, monotonously steadily variable quantity and further quantities form specific mark information versions. The following quantities may form the monotonously, steadily variable quantity:

- momentary aggregate value of frankings
- momentary aggregate value of frankings since the last reloading date
- remaining value that can be used for franking and is still present
- momentary date/time data momentary date/time data since the last reloading date physical data that change in a chronologically known manner.

The presentation of this monotonously, steadily variable quantity ensues in the form of a first number to which a second number relating to:

date of the last reloading time, credit reloading data at the date of the last reloading time, a specific quantity that was measured at the date of the last reloading time and is known only to the postage meter machine and to the central data station, can be optionally added for specific, meaningful combinations.

Each place, or each number formed by predetermined places within the combination number, has a content significance allocated to it. The information relevant for the later evaluation can thus be separated later in an evaluation.

Due to the monotonously, steadily variable quantity, the mark changes at every imprint, making such a franked mailing unmistakable, and this simultaneously supplies information about the previous credit use and the last credit reloading data at the time of the last credit reloading, or about specific, further data such as the last reloading date/time, etc.

The aforementioned information about further data, however, can likewise be interrogated by the post office or by the authority commissioned to carry out this check by the central data station. In this case, when the corresponding quantity forming a second number is stored in the central data station, the monotonously, variable quantity need be only partially involved in the formation of the combination number, and only the part exhibiting a maximum variation is then used for the formation of the first number.

A third number allocated to predetermined places of the combination number corresponds to the size of the postage value. A fourth number corresponds to the information about the corresponding postage meter machine identification number (serial number). The information can be additionally or exclusively printed as barcode in the franking stamp. Such information can likewise be the checksum or some other number derived in a suitable way from the identification number, since the only thing of concern is to check the postage stamp on the mailing, or to indirectly check the postage meter machine with the imprint with respect to manipulation. When a manipulation is found, it must also be possible to open the mailing in order to identify the true sender.

The check procedure therefore contains the following steps:

the postage meter machine communicates its register values to the central data station for the purpose of checking, the time of the next communication by the central data station and/or postage meter machine is determined, the central data station checks the suspicious points and informs the postage meter machine of this or orders a surprise check of the postage meter machine on site, at the same time, the post office or a testing authority commissioned to do so checks the security imprint on the basis of a spot checking or on the basis of an notification from the central data station to the effect that the postage meter machine has been classified as suspicious, of the specific characters additionally contained in the security imprint or of the lack of such specific characters are evaluated when the postage meter machine itself detects a manipulation, in case of a manipulation, the true sender is identified.

The microprocessor of the postage meter machine is employed for the time-dependent production of the mark data, in order to form at least one combination number from the predetermined quantities after the conclusion of all inputs, and to encode the entered information to form a cryptographic number according to a coding algorithm, which is then converted into a mark symbol sequence. For checking a security imprint, a monitoring of mailings in the fashion of a spot check or a check that is centrally initiated, in order to reacquire the individual information from the printed mark of a security imprint, is made in a post office or similar institution authorized to do so, and in order to compare this information to the information openly printed on the mailing.

The check of the mark symbol sequence by the post office is based exclusively on spot checks in a second version. In the spot check, the imprint of an arbitrarily selected mailing is examined for manipulation, without other indications of manipulation or other suspicions having already existed. After the acquisition of all symbols of a symbol sequence and the conversion thereof into data, the decoding thereof can be undertaken with the DES key. As a result, the KOMBI number is then present from which the quantities, particularly the sum of all franking values and the current postage value are then separated. The separated quantity of postage value is compared to the openly printed postage value.

The value of a separated, current quantity, for example of the aggregate value of all franking values undertaken since the last reloading, is subjected to a monotony test on the basis of data of the most recently acquired value of this quantity. A difference amounting at least to the postage value must be present between the current quantity, co-printed encoded in the mark, and the most recently acquired quantity. In the former instance, the most recently acquired quantity is the aggregate value of all frankings previously undertaken that was stored in the central data station at the last remote interrogation of the register readings. When the corresponding quantity has been separated from the KOMBI number after decoding, any falsification of the postage meter machine serial number can be recognized by a comparison on the basis of the mark.

When no manipulation was found with respect to the identification of the serial number of the postage meter machine, the post office or the institution commissioned to carry out the check communicates the appertaining postage meter machine serial number to the central data station. With this information, the mailings (letters) could be indirectly checked by them in collaboration with the central data station.

When it has been shown without doubt that the imprint was manipulated, the sender indicated on the mailing is checked. The co-printed serial number of the postage meter machine can serve this purpose if an identification of the sender is possible by means thereof or, when present, the sender printed in clear text on the envelope can be used. When such a particular is lacking or when the postage meter machine serial number has been manipulated, the letter can be legally opened for identifying the sender.

The aforementioned mark is preferably printed in the form of a series of symbols in a field of the postage meter machine format simultaneously therewith, using a single printer module. The shape of the symbols with their orthogonal edges enables a pattern recognition with minimum computing-oriented outlay.

An integral measurement of the degree of blackening of the mark with a simple optoelectronic sensor (for example, a phototransistor) and a following A/D converter enables an especially simple and fast machine readability. For this purpose, the symbols are fashioned such that they clearly differ in terms of their integral degree of blackening (portion of the printed area relative to the area of the character field). A specific value at the output of the A/D converter thus corresponds to each symbol. A higher information density is achieved with such a symbol sequence in comparison to a barcode, and space in the postage meter machine print format is thus saved. Also, more information can be printed in coded form with the graphic symbols.

A further advantage compared to a barcode is the good readability of the individual symbols juxtaposed with one another in the mark field as a result of the symbolic nature of the image content and the possibility of verbally acquiring the image content for a manual evaluation. The symbolic nature also enables a visual evaluation by a trained inspector who can evaluate the shape and the informational content of the symbols in addition to enabling automated evaluation.

The invention responds to the need for a machine-readable as well as manually readable and decodable form of the identification which can be visibly applied to the mailing or to a postage tape together with the franking imprint, and which also permits combining constant data and rapidly variable, editable data for postage meter machines and for the print control thereof for a column-by-column printing of a franking print format. The aforementioned approaches of the prior art are either too complicated to achieve a high printing speed, or comprise a plurality of printers or are unsuitable for a time-optimized combining of constant and variable data for forming a print control signal for a single printer.

The invention presumes that, after the postage meter machine is turned on, the postage value in the value imprint is automatically prescribed according to the last input before the postage meter machine was turned off and the date in the postmark is automatically prescribed according to the current date. The variable data are electronically embedded into the fixed data for the frame and for all associated data that have remained unaltered for the imprint. The variable data of the window contents are referred to below in brief as window data and all fixed data for the value stamp, the postmark and the advertising slogan stamp are referred to as frame data. The frame data can be taken from a first memory area of a read-only memory (ROM), which simultaneously serves as the program memory. The window data are taken from a second memory area and, corresponding to the input, are stored in a non-volatile main memory and can be taken therefrom at any time for the purpose of combination for forming an overall presentation of a franking format.

It is inventively proposed that hexadecimal window data be transmitted into a separate memory area of a non-volatile main memory in run length-coded form and be stored therein. When no new input is undertaken, a transfer into a volatile pixel memory and an ordering of the window data into the frame data in accord with the predetermined allocation ensue. It is thereby possible on the basis of the invention, however, to work in time-optimized fashion, so that the printing speed becomes high. Inventively, the data from both memory areas are combined to form a pixel print format according to a predetermined allocation before the printing and are completed during the printing to form a column of the overall postage meter machine print format. Those variable data that are embedded into the printing column during printing comprise at least the mark data. The time expended for the previous combining of the overall pixel image with the remaining data is correspondingly reduced. The prior combining ensues similar to the date in the postmark and similar to the postage value in the value imprint, whereby the variable information can be subsequently augmented and modified in the window provided for that purpose. In order to save time, only the parts of a graphic presentation that are in fact modified are newly stored in the non-volatile main memory given a modification.

DESCRIPTION OF THE DRAWINGS

FIGS. 3*f*–3*o* illustrated a set of symbols for a mark field in the advertising slogan produced in accordance with the invention.

FIG. 4*a* illustrates the structure of a combination number.

FIG. 4*b* is a block diagram of an evaluation circuit for the security imprint constructed in accordance with the invention.

DESCRIPTION OF THE PREFERRED EMBODIMENTS

Figure 1:
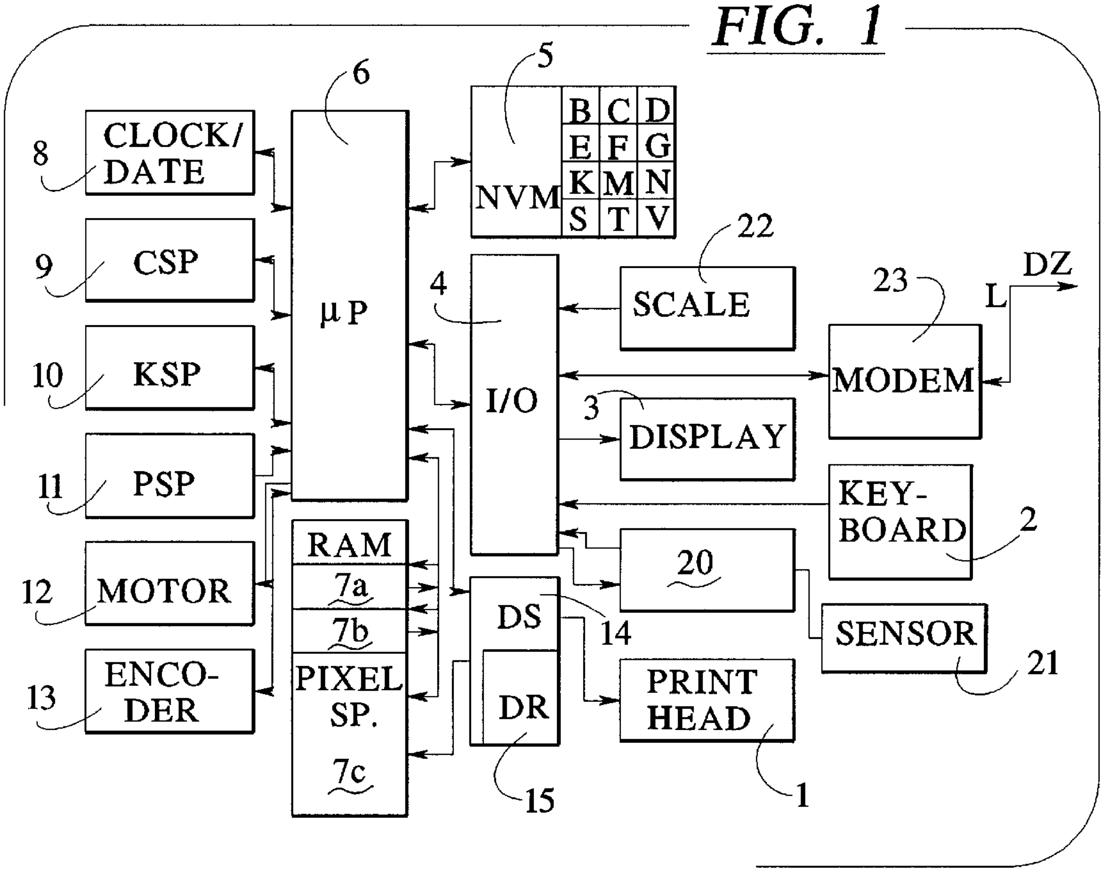
FIG. 1 is a circuit diagram of a first version of the postage meter machine of the invention.

FIG. 1 shows a block circuit diagram of the postage meter machine of the invention, having a printer module 1 for a fully electronically produced franking image that contains an advertising slogan and/or a mark for a security imprint, at least one input unit 2 having actuation elements, for entering data and instructions and a display unit 3. The input unit 2 and the display unit 3 are connected to an input/output control module 4, having a non-volatile memory 5 for at least the constant parts of the franking image. The postage meter machine also includes a control unit 6. A character memory 9 supplies the necessary printing data for the volatile main memory module 7. The control unit 6 is a microprocessor ($\mu$P) that is in communication with the input/output control module 4, the character memory 9, the volatile main memory module 7 the non-volatile main memory 5, a cost center memory 10, a program memory 11, a conveyor or feeder unit 12, potentially with a tape trigger, an encoder (coding disc) 13, as well as with a clock/data module 8 that is in constant operation. Another method for improving the security of postage meter machines according to German Patent Application P 43 44 476.8 is based on the consideration of making the counterfeiting of data stored in the postage meter machine so difficult that the outlay is no longer worth the effort for a manipulator. A sensor 21 having a detector 20 can be connected to the input/output control module 4 of the postage meter machine in conjunction with this method—in the way shown in FIG. 1. In another version, however, a corresponding security means can be provided directly at the microprocessor or within the microprocessor—in a way that is not shown in FIG. 1.

The preferred arrangement for generating a security imprint for postage meter machines includes a first memory area A (among other things, for the data of the constant parts of the franking format, including the advertising slogan frame) in the program memory 11. Sub-memory areas $A_i$ are provided for i=1 through m frame or fixed data, whereby an allocated index i identifies the respective frame that is preferably allocated to a specific cost center. A cost center number is usually entered in order, among other things, to thus select the advertising slogan. An advantageous method for user-orientated accounting, however, can be adopted in accordance with the invention wherein the selected slogan is examined in order to automatically identify the cost center which is to be billed.

All alphanumerical characters or symbols are deposited pixel-by-pixel as binary data in the character memory 9. Data for alphanumerical characters or symbols are stored compressed, in the form of a hexadecimal number in the non-volatile main memory 5. As soon as the number of the cost center is entered, i.e., is stored in the memory area C, the compressed data from the program memory are converted with the assistance of the character memory 9 into a print format having binary pixel data, the print format being stored in the volatile main memory module 7 in such a decompressed form.

Corresponding to the position report supplied by the encoder 13 regarding the feed of the postal matter or the paper tape in relation to the printer module 1, the compressed data are read from the main memory 5 and are converted with the assistance of the character memory 9 into a print format having binary pixel data, this being likewise stored in the volatile main memory module 7 in such a decompressed form. For explaining the invention, reference will be made to main memories **7*a* and 7*b* and pixel memory 7*c*, even though these are preferably all a part of a single memory module 7**.

The main memory **7*b* and the pixel memory 7*c* are in communication with the printer module 1 via a printer control 14 having a print register 15 and output logic. The pixel memory 7*c* has an output side connected to a first input of the printer control 14, which has further control inputs to which output signals of the microprocessor control unit 6** are supplied.

Once called in, the constant parts of the franking format and advertising slogan are available, constantly decoded, in the pixel memory area I in the volatile pixel memory **7*c*. For a fast modification of the window data, a second memory area B is present in the non-volatile main memory 5. The pixel memory area I in the pixel memory 7*c* is likewise provided for the selected, decompressed data of the variable parts of the franking format which are identified with the index j. The second pixel memory area II in the pixel memory 7*c*** is provided for the selected, decompressed data of the variable parts of the franking format which are identified with the index k. These are the mark data, which are only formed immediately before the printing of the security imprint.

A method and an arrangement for fast generation of a security imprint with only one microprocessor and one printer module in a postage meter machine are disclosed in European Application 576 113. The embedding of the print data of the mark information into the other print data preferably ensues during the printing of the respective column.

For producing the security imprint, the fully electronically generated print format makes it possible to embed the variable data of the mark into one or more windows within a fixed frame established by the postage meter machine print format during the column-by-column printing. A critical reason why the printing speed is not reduced by the required time for forming the mark data is the exploitation of a time reserve during printing by the microprocessor control unit 6 that implements the column-by-column embedding of window data.

The memory areas B through ST in the non-volatile main memory 5 can contain a plurality of sub-memory areas in which the respective data are present, stored in datasets. The sub-memory areas $B_j$ are provided for j=1 through n window data and the sub-memory areas $B_k$ are provided for k=1 through p window data, whereby different allocations between the sub-memory areas of the various memory areas can be selected and/or are stored in a predetermined arrangement.

The number chains (strings) that are entered for generating the input data with a keyboard 2, or via an electronic scale 22 that is connected to the input/output unit 4 and which calculates the postage fee, are automatically stored in the memory area ST of the non-volatile main memory 5. Data sets of the sub-memory areas, for example $B_j$, C, etc. are also preserved. It is thus assured that the last entered quantities are preserved even when the postage meter machine is turned off, so that the postage in the value imprint upon turn-on is automatically prescribed in accord with the last entry before the turn-off of the postage meter machine, and the date in the postmark is automatically prescribed according to the current date.

The corresponding allocation of the respective cost center to the frame data is automatically interrogated after the turn-on. In another version, the cost center information must be entered again into the memory area C during the start routine after every turn-on, but it is preserved given brief-duration interruptions in the operating voltage. The number of printed letters with the respective, aforementioned setting of the advertising slogan regarding the cost center is registered in the postage meter machine for a later evaluation.

In each data set, a control code and frame data, for example window data, are stored in respective alternating adjacent sub-memory areas $A_i$, $B_j$ . . . $B_k$.

Before the initial printing, the respective, selected, common frame data for the advertising slogan stamp, for the postmark and for the postage stamp are transferred from the non-volatile program memory 11 into the registers 100, 110, 120, . . . , of the volatile main memory 7*a*. The control code is decoded during the transfer and is stored in a separate memory area of the main memory area 7*b*. Likewise, the respective, selected window data are loaded into the registers 200, 210, 220, . . . . Preferably, the registers are formed by sub-memory areas in the memory area of the main memory 7*a*. In another version, these aforementioned registers are a component of the microprocessor control unit 6.

The run-length-coded hexadecimal data are converted into corresponding, binary pixel data by decompression (expansion). The decompressed, binary pixel data that remain unaltered over a longer time span can be accepted into a first pixel memory area I and the binary pixel data that are related to the mark data, which constantly change with every imprint are accepted into the second pixel memory area II. FIG. 1 shows a block circuit diagram of such a first version of the invention.

The chronologically less variable (semi-variable) window data are subsequently referred to below as window data of type 1. The constantly changing (variable) window data are referred to below as window data of type 2.

New frame and/or window data of type 1 can be selected as long as there is a need for that type of data after the insertion and storing of binary pixel data into the first pixel memory area I. When this is not the case, an automatic generation of window data of type 2 follows with subsequent decompression as well as the entry thereof into the second pixel memory area II as binary pixel data. In another version that is not shown, the aforementioned steps can be repeated if there is still not yet a print request. The combining with the other binary pixel data stored in the pixel memory area I preferably ensues after the presence of a print request during a printing routine.

The data in the memory areas C, D and E can be modified with the input unit 2 and with the control unit 6. The same microprocessor of the control unit 6 that also implements the debiting routine and the printing routine is preferably utilized. The data from the memory areas are thereby composed during printing to form an overall presentation of a security imprint according to a previously defined allocation (freely selectable within certain limits). For example, fourth and fifth memory areas D and E of the non-volatile main memory 5 can be used for this purpose. A name is stored in the fourth memory area B of the non-volatile memory 5, this name identifying the currently set frame of an advertising imprint, whereas data for a further, selectable allocation of at least one advertising imprint part to a frame of the advertising imprint corresponding to the aforementioned name are stored in a fifth memory area E. It is provided that the data from the memory areas are composed during printing to form an overall presentation of a security imprint corresponding to a previously defined allocation (freely selectable within certain limits).

The identification of a postage meter machine generally ensues with an 8-place serial number which, however, need only partially enter into the mark symbol sequence in order to enable a check of the serial number printed in clear text. In a simple version, for example, this can be the checksum of the serial number. In more complicated, other versions, other data also enter into forming what is preferably at least a 2-place number that allows the checking of the serial number.

In a modification of the solution disclosed in German OS 40 03 006, in particular, an identification of postal matter on the basis of a mark generated with a cryptographic number can be undertaken for enabling an identification of postage meter machine without difficulties. The multi-place cryptographic number is not formed using the data values of the entire label stored as a hexadecimal number, but is formed and intermediately stored only using selected data values of the label frame and further data such as the machine parameters of the value setting and of the date. Not only numeral or numerical values such as the number of the advertising slogan, but also data values of the image information can be utilized in the method of the invention to form the encoded information. Differing from German PS 40 03 006, any arbitrary region of the advertising slogan to which separate data are allocated in a data set can be utilized for the formation of the cryptographic number. To this end, individual data are selected from this data set. It is thereby advantageous to identify that the column end for each column to be printed, as a control code that adjoins the run-length-coded hexadecimal data. The run-length-coded hexadecimal data residing at the first location of the data set can be preferably employed.

In a further development of the invention solution, the data of the column-by-column, regional image information are selected from the data set dependent on a quantity that is present and/or generated in the machine, particularly by the current date, in order to take at least a number of data (hexadecimal numbers).

Further, a plurality of data sets can also be allocated to each advertising slogan number, each data set comprising those data pertaining to a sub-region of the advertising slogan. Again, the data set having the appertaining data of the column-by-column, regional image information is thereby selected dependent on a quantity present and/or generated in the machine in order to take at least a number of data (hexadecimal numbers).

Those run-length-coded hexadecimal data corresponding to a predetermined printing column are preferably combined and encoded together with at least some of the data of the machine parameters (serial number, monotonously variable quantity, time data, inspection data such as, for example, the number of imprints at the last inspection, or a variable measuring the "suspiciousness" of the machine) and of the postage value. The data are combined and encoded to form a number in a specific way set forth in conjunction with FIG. 10. In the formation of newly coded window data and before the entry thereof in the second memory area II, the DES algorithm (data encryption standard), for example, can be applied for encoding, and additionally a conversion into a specific graphic character set can be applied for a high security standard. The encoding of a combination number comprising a first, third and fourth number suffices in a data set that is 8 bytes long.

A conversion of a cryptographic number into an identifier comprising symbols is undertaken by the character memory 9. In particular, a list that allocates graphic symbols to the individual cryptographic numbers and is selected by a further quantity, such as by the postage fee, is employed. The encoded, hexadecimal data are thereby decompressed in the character memory in order to print the identifier formed of the symbols to be printed. This is also a machine-readable mark.

Other encoding methods and methods for converting the cryptographic number into a mark or identifier are likewise suitable.

It is especially advantageous when the window data of type 2 for the security marks are accommodated in a separate window in the postage fee stamp or in the postmark or between the two stamps. The entire franking imprint is thus not enlarged (which is also not postally permitted), and an additional printer that prints at a different location of the letter is not required.

Especially produced, encoded mark data deposited in a memory area F can be additionally utilized for identification—for example, of the postage meter machine serial number. A further possibility is to produce machine-readable version of the postage meter machine serial number that is printed unencoded as a barcode, the data thereof being taken either from the memory area F of the non-volatile main memory 5 or from the program memory 11 in order to insert the data into the franking image—as shown, for example, with reference to FIG. 3*e*. An identification of the sender address, applied with a separate printer in the form of a barcode can be encouraged by offering a rebate for doing so. Inventively, these aforementioned inclusions in the printed imprint can reduce the outlay for checking mailings because they allow a directed, machine check of specific senders, or of their postage meter machines. In a second version that the central data station identifies suspicious postage meter machines and communicates the serial numbers to the postal authority, or to an institution commissioned to carry out a check.

Newer postage meter machines are loaded with a new, reloaded credit with a telesetting FWV by a central data station. For every postage meter machine user, the central data station stores the credit amounts and the times at which these credits were transferred to the postage meter machine. Further security checks for checking the proper use of the postage meter machine are possible on the basis of these data stored in the central data station.

Figure 2:
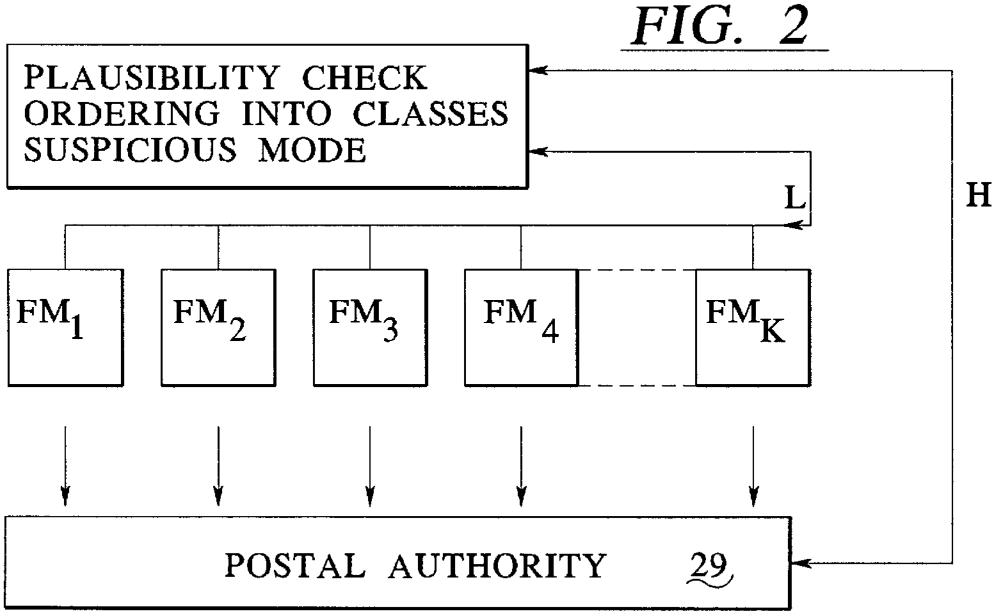
FIG. 2 is a flow chart of a communication which includes an evaluation of the security imprint of the invention.

FIG. 2 shows the communication required in an evaluation of the security imprint of the invention. First, a data connection line L is required for reloading credits. At the same time, the central data station receives information about the respective postage meter machine on the occasion of every communication via the data connection line L. After the evaluation thereof, the central data station sets up a data connection, as necessary, via a line H to the post office, or to the institution authorized to evaluate the franking stamps of the mailings.

In the first version of the check, a check of the mailings is initiated by the postal authority, assuming that a postage meter machine is considered suspicious. The postal authority receives the information from the central data station via the data connection line H together with the serial number. The data connection line H is also used for inquires on the part of the post office dependent on the type of evaluation. The data connection line L is provided for inquiries from the postage meter machine to the central data station.

In a first centrally initialized checking version according to the invention, the central data station calculates an average postage use $P_k$ on the basis of the user-associated, historical data of a specific time period in the past. The inventive method presumes that the average credit influx corresponds to the average credit outflow, i.e. to the average postage use. This is expressed as the ratio of the sum of the credits G transferred in the time period under consideration and the sum of the time periods t lying between the reloadings:

$$P_k = \frac{i = \sum_{1}^{n} G_{K,i}}{i = \sum_{1}^{n} t_{K,i}} \tag{1}$$

On the basis of this average postage use $P_K$ of the postage meter machine user K and proceeding from his last reloading of credit $G_{K,n}$, the presumable chronological duration $t_{K,n+1}$ up to the next credit reloading can be calculated:

$$t_{K,n+1} = \frac{G_{K,n}}{P_K} \cdot (1 + 1/\beta) \tag{2}$$

The term (1+1/β) serves the purpose of compensating normal fluctuations of the postage use. A surcharge 1/β is therefore placed on $G_{K,n}$ (in this example, preferably 10%, i.e. 1/β=1/10).

The postage meter machine can communicate the following register values to the central data station before a credit reloading:

R1 (descending register): remaining amount on hand in the postage meter machine, R2 (ascending register): aggregate used amount in the postage meter machine, R3 (total resetting): the previous aggregate sum set for all telesettings, R4 (piece count Σprinting with value≠0): plurality of valid imprints, R8 (R4+piece count Σprinting with value=0): plurality of all imprints.

Taking the sum (aggregate use amount R2) of all previously loaded (used) reloaded credits stored in the ascending register, the following also applies:

$$R_2 = \sum_{i=1}^{n} G_{K,i} \tag{3}$$

A value R2 taken from the ascending register corresponds to the interrogated value. The future value $R2_{new}$ is derived according to the reset (re-funding) request which should lead to a reloaded credit $G_{K,n+1}$ that must be added to the current interrogated value R2, i.e.

$$R2_{new}-R2=G_{K,n+1} \quad (4)$$

Also valid:

$$R1=R2+R1 \quad (5)$$

Taking a postage credit (remaining amount R1) that is still available and is stored in the descending register of the cost center memory 10, the following total value can thus be used for frankings:

$$R1_{new}=R1=G_{K,n+1} \quad (6)$$

The remaining amount R1 can be interrogated and statistically evaluated at every telesetting. As the remaining amount R1 becomes increasingly larger, the same reloaded amount can be reloaded at increasingly longer reloading intervals, or the number of items that are allowed to be franked before the next communication can be set lower. Based on this consideration, and because reloaded amounts are usually requested with the same amount, the presumable chronological duration $t_{K,n+1}$ up to the next credit reloading is then calculated according to the following equation:

$$\text{i } t_{K,n+1}=(G_{K,n+1}+R1\cdot\alpha_x)\cdot 1/P_K \quad (7)$$

The disposition factor $\alpha_x$ is dependent on the classification of the postage meter machine user as an A, B or C customer.

On the basis of the average postage use $P_K$ calculated for the user K, the disposition factor $\alpha_K$ is allocated to one of, for example, three use categories A, B and C:

$$P_K \leqq P_{A/B} \rightarrow \alpha_A \quad (8)$$

$$P_{A/B} < P_K \leqq P_{B/C} \rightarrow \alpha_B \quad (9)$$

$$P_K > P_{B/C} \rightarrow \alpha_C \quad (10)$$

A typical disposition factor $\alpha_A$, $\alpha_B$, $\alpha_C$ is allocated to each of these use categories, in accord wherewith the longest time ($t_A$) per time interval is reached according to equation (6) in the use category A, i.e. the category having the lowest use, and the shortest time ($t_C$) is reached in use category C.

A simplification of this calculation strategy can be achieved if the individual quantities $\alpha_K$ and $t_{K,n+1}$ are not newly calculated for each user K, but a classification is undertaken instead. On the basis of the average postage use $P_K$ calculated for the user K, this user K is classified into one of, for example, three use categories A, B and C.

$$P_K \leqq P_{A/B} \rightarrow A \quad (11)$$

$$P_{A/B} < P_n \leqq P_{B/C} \rightarrow B \quad (12)$$

$$P_K > P_{B/C} \quad (13)$$

Each of these use categories has a typical use time $t_A$, $t_B$, $t_C$ allocated to it, whereby the use category A, i.e. the category having the lowest use, is assigned the longest time ($t_A$) per time interval and the shortest time ($t_C$) is assigned to the use category C.

When the point in time $t_{K,n+1}$, or $t_A$, $t_B$ or $t_C$, is exceeded, the associated $K_{th}$ postage meter machine $FM_K$ is fundamentally considered suspicious. A plausibility check of all postage meter machines in use is implemented at regular intervals in the central data station. In this procedure, the machines whose franking behavior seems suspicious, or that have been obviously manipulated, are identified and reported to the postal authority. A variety of reactions containing a plurality of steps are now possible upon entry into this suspicious mode:

(a) The central data station contacts the $K^{th}$ postage meter machine $FM_K$. This can occur automatically given the presence of a modem connection. A telephone call to the $FM_K$ customer is required in the case of what is referred to as voice control.

In any case, the customer or the postage meter machine is requested to carry out the overdue communication. In a communication, the central data station can request the current register readings in order to check the size of the remaining credit or in order to receive further statistical data about the use of the $K^{th}$ postage meter machine $FM_K$. For security reasons, this transmission is protected in the same way as the telesetting itself. For example, encoding of the message with the DES key serves this purpose. The central data station can then transmit the message, as warranted to the $K^{th}$ postage meter machine $FM_K$ that it is no longer suspicious. Otherwise, the $K^{th}$ postage meter machine $FM_K$ switches into the suspicious mode. This means that it must be checked on site within a limited time when a communication between the central data station and the postage meter machine is not subsequently carried out.

The central data station also monitors the behavior of the postage meter machine user on the basis of further data transmitted during the communication in order to identify suspicious postage meter machines. Such data specifically associated with a postage meter machine such as the number frankings undertaken or all imprints (register values R4 or R8) can also enter into the calculation for identifying the postage meter machine profile. The following equations can be advantageously applied in succession:

$$V_{susp1} = \frac{R4}{R3 - R1_{old}} \cdot F_{min} = \frac{R4}{R2} \cdot F_{min} \quad (14)$$

and, in order to check the change in case $R1_{old} \neq R1_{new}$, also:

$$V_{susp2} = \frac{R4 - R4_{old}}{R1_{old} - R1_{new}} \cdot F_{min} \quad (15)$$

with $R1_{old}$: R1 interrogated value at the $n^{th}$ telesefting $R1_{new}$: R1 interrogated value before the $(n+1)^{th}$ telesetting of a reloaded credit $V_{susp}$: Heuristic value that provides information about the condition of the postage meter machine $F_{min}$: minimum franking value.

Given a minimum franking value of, for example, $F_{min}$= 20 cents, the following cases can be distinguished:

$V_{susp1}$<5 okay $V_{susp1}$=5 . . . 100 suspicious $V_{susp1}$>100 manipulated A postage meter machine profile can thus be produced on the basis of the data specifically associated to a postage meter machine. This postage meter machine profile provides information as to whether a customer was capable, with the reloading events that were carried out, to make the identified number of frankings. Two stages are distinguished within the suspicious mode:

Stage 1: postage meter machine is suspicious

Stage 2: postage meter machine has been manipulated.

A suspicious mode can only be activated by the central data station, but it has no immediate influence on the operation of the postage meter machine.

(b) Just as in the central data station, the $K^{th}$ postage meter machine $FM_K$ can independently identify and display the message that it is suspicious. With this display of the message, the $K^{th}$ postage meter machine $FM_K$ switches into the suspicious mode. This means that the central data station initiates an on site inspection within a limited time if a communication between the central data station and the postage meter machine is not subsequently carried out. Such a communication, for example, can be undertaken for the purpose of a telesetting of a credit.

In the telesetting of a credit, the individual transactions are successively implemented within encoded messages. After the input of the identification number (ID number) and of the intended input parameters, the postage meter machine checks to determine whether a modem is connected and operational. If this is not the case, a display is made that the transaction request must be repeated. Otherwise, the postage meter machine reads the selected parameters composed of the selection parameters (main office/branch, etc.) and the telephone number from the NVRAM memory area N and sends these together with a selected request command to the modem 23. The call setup to the central data station via the modem 23 required for the communication subsequently ensues.

The communication of the encoded initialization message to the central data station ensues following the call setup. Contained therein, among other things, are the postage fetching number for making the calling party, i.e. the postage meter machine, known at the central data station. The communication of the encoded register data to the central data station also ensues.

This initialization message is checked in the central data station for plausibility, the postage meter machine is identified, and is evaluated for errors. The central data station recognizes what request the postage meter machine has made and sends a reply message to the postage meter machine as a prefix.

When a prefix has been received, i.e. the postage meter machine has received an OK message, a check of the prefix parameters in view of a change of telephone number ensues. If an encoded parameter was communicated, there is no change of telephone number and a begin message is sent encoded to the central data station by the postage meter machine. When the reception of proper data is identified thereat, the central data station begins to implement a transaction. In the aforementioned example, new reloading credit data are transmitted encoded to the postage meter machine, which receives these transaction data and stores them. In another version, the postage meter machine is switched from the suspicious mode back into the normal mode at every successful communication.

Simultaneously, the status of the postage meter machine is calculated again in the central data station on the basis of the newly transmitted register values.

(c) Inventively, a message can be sent to the postal authority in this first check version in addition to the reactions (a) or (b), this postal authority being responsible for inspecting the $K^{th}$ postage meter machine $FM_K$. For example, this postal authority can then initiate a directed check of the franking of the mailings, and may initiate an on site inspection when the inquiries that were undertaken have shown that the postage meter machine must have been manipulated.

When the central data station has found that the postage meter machine is suspicious, the relevant postage meter machine serial number is communicated to the postal authority or to the institution commissioned to carry out the check. Among other things, the occurrence of the letters or mailings franked by this suspicious postage meter machine can thus be monitored if the letters or mailings have a machine-readable address of the sender, or have the postage meter machine serial number. The occurrence of the letters franked by this suspicious postage meter machine is monitored by counting the plurality thereof and/or the aggregate sum thereof over a time interval of, for example, ninety days and is compared to the credit value that was present in the postage meter machine since the last reloading.

Figure 3A:
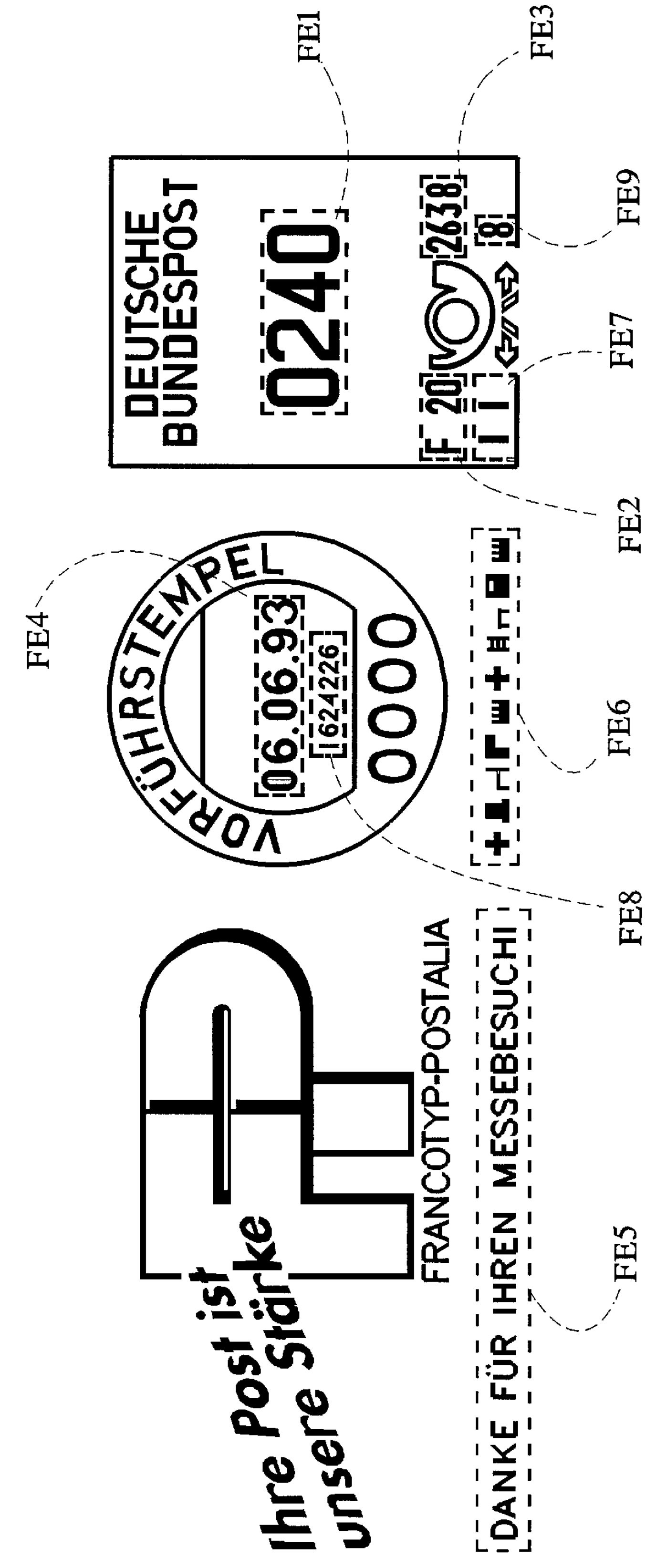
FIG. 3*a* is an illustration of a security imprint with a mark field produced in accordance with the invention.

(d) Independently of or in combination with the reactions a) through c), a special character is activated after the assumption of the suspicious mode by the $K^{th}$ postage meter machine $FM_K$ and is co-printed in the franking imprint at a predetermined location. In the simplest case, this character can be a cluster of printed picture elements or can be a barcode that, for example, is printed to the right of the field FE 9 (FIG. 3*a*). When checking the franking imprint, the postal authority is immediately provided with the indication that this postage meter machine is suspicious. In response thereto, the postal authority can implement a check of the franking of the postal matter and, when the suspicion becomes firmer, can, for example, implement an on site inspection of the $K^{th}$ postage meter machine $FM_K$.

If the imprinting of such suspicious characters according to (d) is known to the manipulator of the $K^{th}$ postage meter machine $FM_K$, the manipulator may attempt to eliminate this imprint. This is countered by printing, in encrypted form, the information that the machine is in the suspicious mode. One further digit suffices for this, this being encrypted together with the other quantities (postage value, date and, potentially, postage meter machine serial number) and is printed in a suitable form, for example of the symbol sequence of FIGS. 3*a* through 3*e*. In another version, which does not require space for a further digit for a suspicious variable $SV_v$, a fourth number which allows the checking of the serial number in the combination number is set to a specific value that can normally not occur.

When, in the reactions according to the first supervision version, the check of the correct operation of a postage meter machine was essentially initiated by the telesetting center, i.e., by the central data station, or was at least duplicated there, this initiative in the reaction according to a second supervision version via the security imprint and the review thereof proceeds from the responsible authority or institution and, ultimately, indirectly from the postage meter machine itself, whereby the central data station and the post office or the checking institution only monitors the reaction after the fact.

In the second monitoring version, a spot check is implemented for arbitrarily selected postal items or senders. The security imprint is evaluated in collaboration with the central data station. Postage meter machine data that are stored in the central data station and that are not openly printed on the mailing are interrogated via the data connection H.

In the spot check, the imprint of an arbitrarily selected postal item is checked for manipulation. After the acquisition of all symbols of a symbol sequence and the conversion thereof into data, their decoding can be undertaken with the corresponding DES key. The KOMBI number is then present as a result thereof, with the quantities, particularly the sum of all franking values and the current postage value being separated therefrom. The separated quantity of postage value G3 is compared to the postage value G3' actually imprinted.

The quantity G4 that has been separated out, i.e. the aggregate value of all franking values undertaken since the last reloading, is subjected to a monotony test on the basis of data of the most recently acquired quantity G4'. A difference amounting to at least the amount of the postage value must be present between the quantity G4 actually co-printed encoded in the mark and the most recently acquired quantity G4'. In the simplest case, the most recently acquired quantity G4' is the aggregate value of all previously undertaken frankings that is stored in the central data station at the most recent remote interrogation of the register readings. The falsification of the postage meter machine serial number can likewise be recognized with the mark by separating the quantity G0 from the combination number after the decoding and checking the separated quantity G0 in a similar manner.

When it has been proven beyond doubt that the imprint had been manipulated, the sender indicated on the mailing is checked. The serial number of the postage meter machine which is co-printed can serve this purpose, from which an identification of the sender can be made, or, if present, the sender printed in clear text on the envelope can serve this purpose. When such a particular is lacking or when the postage meter machine serial number has been manipulated, the letter can be legally opened for identifying the sender.

The postage meter machine accumulates the used postage values since the last credit reloading, or forms a remaining value, by subtracting the sum of the used postage values from the credit previously reloaded. This value is updated with every franking, and is combined in common with other security-relevant data (postage value, date, postage meter machine serial number), encrypted for protection against falsification, and finally is printed in the above-described way. After the acquisition of the security imprint and after the decrypting as well separation of the individual data, as already set forth in the aforementioned way, the evaluation ensues. The comparison of the postage values and the monotony check can be implemented in the aforementioned way. The information about the postage values W used since the last credit reloading is now compared to the data for this postage meter machine stored at the checking location.

In the simplest case, the value W is compared to a fixed threshold that cannot be upwardly transgressed given normal use of the postage meter machine. A basis for considering the machine suspicious exists given an upper transgression.

In an improved version, the postage value W is compared to a threshold SWn that corresponds to the respective postage use category. These postage use categories can be defined once for the use of the respective postage meter machine, however, they can also be derived from statistics kept for each postage meter machine. The statistics can be managed by the inspecting postal authority, or the statistical data can be used which the central data station produces anyway, and that are then transmitted to the postal authority.

A further sophistication in the check is achieved according to a first version of the mark information, wherein the date of the last credit reloading $t_L$ is also contained as a second number in the combination number and is co-printed with the other data in encrypted form. The postal authority is then able to also check to what extent certain defined, maximum time intervals between two credit reloading have been exceeded, as a result of which the postage meter machine became suspicious. Moreover, the postal authority would be able to identify the current postage use P since the time $t_L$ of the last credit reloading with $t_A$ as current date, according to the following equation:

$$P = \frac{W}{t_A - t_L} \tag{16}$$

The same criteria as already set forth in conjunction with the first version of the check can be established for the check of P.

For example, the date/time data for a monotonously, steadily increasing quantity can be used in another version of the mark information. So that additional space for imprinting the date of the last credit reloading is not required in the security imprint, these data can be combined with the absolute time count in this version. This latter is required in order to recognize forgeries in the form of copies with a monotony check according to a first evaluation version set forth in FIG. 4*c*. The time data are then composed of two components:

1. Date of the last credit reloading
2. Absolute time count between the credit reloadings with resetting.

The manner by which this information can be visually/manually or automatically acquired together with the clear text information shall be discussed below in conjunction with the discussions of FIGS. 4*a* through 4*c*.

The serial number can also be printed out as a barcode. All other information is presented in accordance with the invention in a different way, because a barcode requires considerable space in the postage meter machine print format dependent on the coded information which is set under certain circumstances, or forces the postage meter machine imprint to be enlarged to accommodate all information to be contained in the barcode imprint.

Inventively, an especially compact imprint composed of specific graphic symbols is employed. An identifier formed, for example, of symbols to be printed can be printed preceding or, following, under and/or over a field within the actual postage meter stamp imprint. The invention thus achieves a mark that can be read by a human, which is also machine readable.

An envelope 17 (FIG. 17) conveyed under the printer module 1 is printed with a postage meter machine stamp. In a way that is advantageous for an evaluation, the mark field is thereby located in a line under the fields for the value stamp, for the postmark, for the advertising slogan and, as warranted, in the field for the optional print addendum of the postage meter machine stamp format.

It may be seen from a first illustration of a first example of the security imprint shown in FIG. 3*a* that a good readability is established with good recognition certainly for manual evaluation as well as for machine readability.

The mark field is thereby located in a window FE6 arranged within the postage meter machine print format under the postmark. The value stamp contains the postage value in a first window FE1, the machine serial number in second and third windows FE2 and FE3 and, as warranted, a reference field in a window FE7 and, as warranted, a particular indicating the number of the advertising slogan in a window FE9. The reference field serves the purpose of a pre-synchronization for reading the graphic character sequence and for acquiring a reference value for the light/dark threshold in a machine evaluation. A pre-synchronization for the reading of the graphic character sequence is also achieved by and/or in combination with the frame, particularly of the postal value character or value stamp.

The fourth window FE4 in the postmark contains the current date or the pre-dated date input in special cases. The mark field can also include an eighth window FE8, particularly for high-performance postage meter machines, for printing the exact time of day in successive tenths of a second. When the time of day is shown in such a finely divided manner, no imprint is identical to any other imprint, so that counterfeiting by copying the imprint with a photocopier can be documented.

A fifth window FE5 is provided in the advertising slogan for an editable text part of the advertising slogan.

Figure 3B:
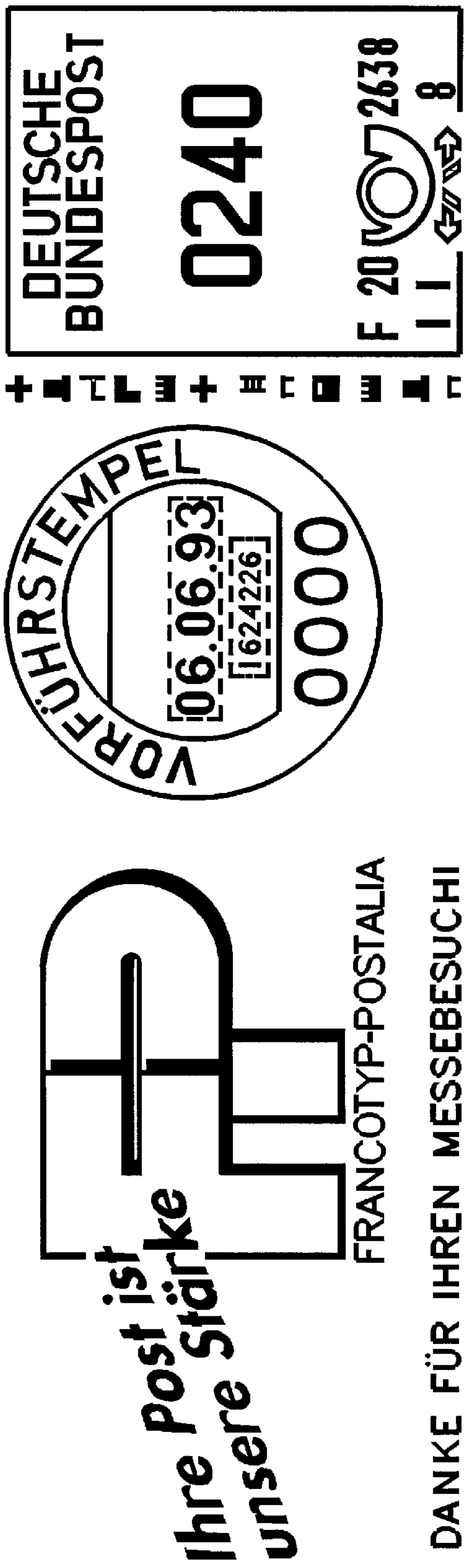
FIGS. 3*b*–3*e* respectively illustrate further versions of the arrangement of mark fields for the security imprint produced in accordance with the invention.

FIG. 3*b* shows the illustration of a security imprint with a mark field in the columns between the value stamp and the postmark, whereby the preceding, vertical part of the frame of the value stamp serves the purpose of pre-synchronization and, as warranted, as a reference field. The need for a separate window FE7 is thus eliminated. The mark data in this version can be acquired approximately simultaneously in the shortest possible time with a vertical arrangement of the symbol sequence.

Compared to the windows shown in FIG. 3*a*, it is also possible to eliminate further windows for the open, unencoded imprint. On the other hand, the printing speed can thus be increased because fewer windows must be embedded into the frame data before the printing and, thus, the formation of mark data can begin earlier. The encrypted imprint with mark signals without an open, encoded imprint of the absolute time in a window FE8 already suffices for achieving a simple protection against copying. The mark data that are generated on the basis of at least the postage value and such a time count, and that are located in the mark field FE6, are already adequate—as shall be set forth below with reference to FIG. 10.

Figure 3C:
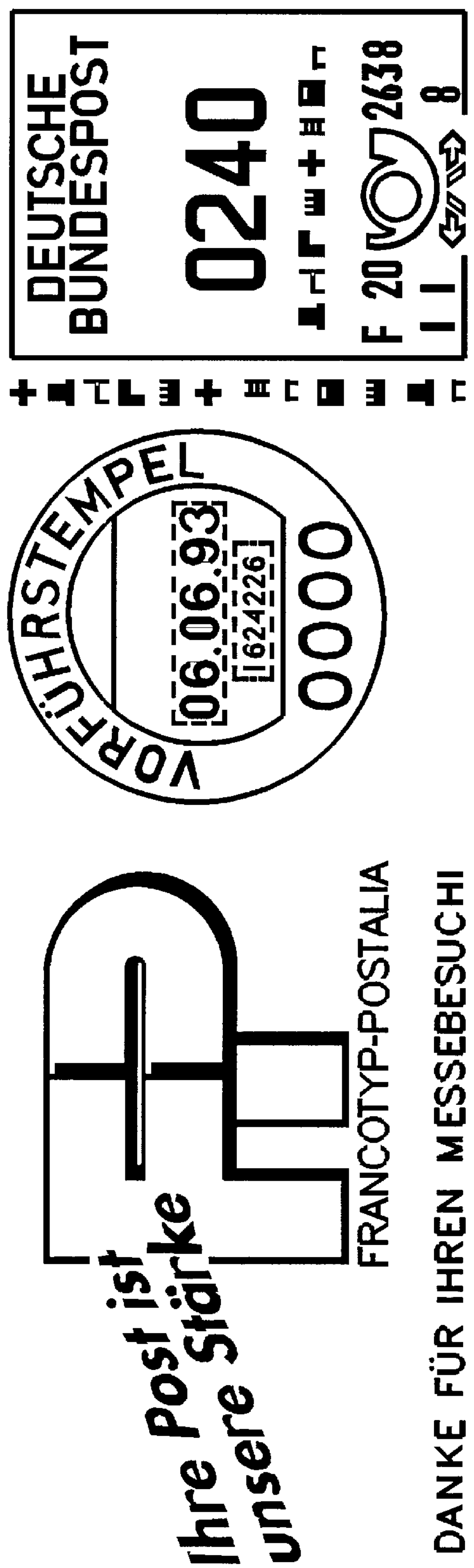

In a third example of a security imprint shown in FIG. 3*c*, a further mark field in the postal stamp is arranged under the window FE1 for the postage value in addition to the version shown in FIG. 3*b*. Further information about, for example, the number of the selected advertising slogan can be communicated unencoded, but in a machine-readable form.

Figure 3D:
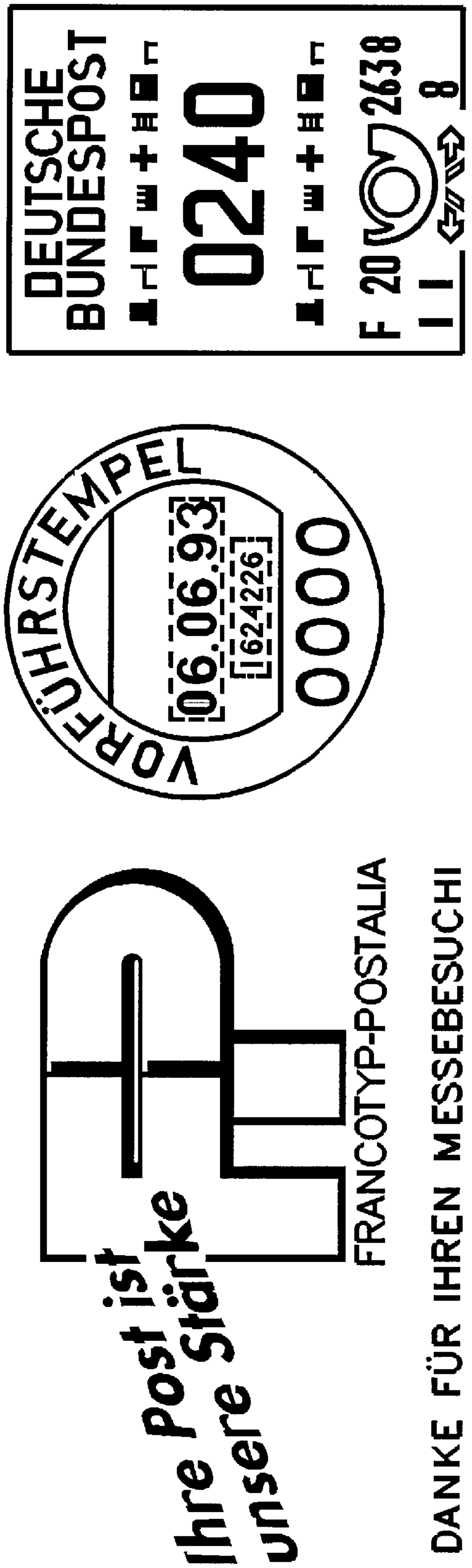

In a fourth example of the security imprint, two further mark fields are arranged in FIG. 3*d* in the postal stamp under and over the window FE1 for the postage value.

Figure 3E:
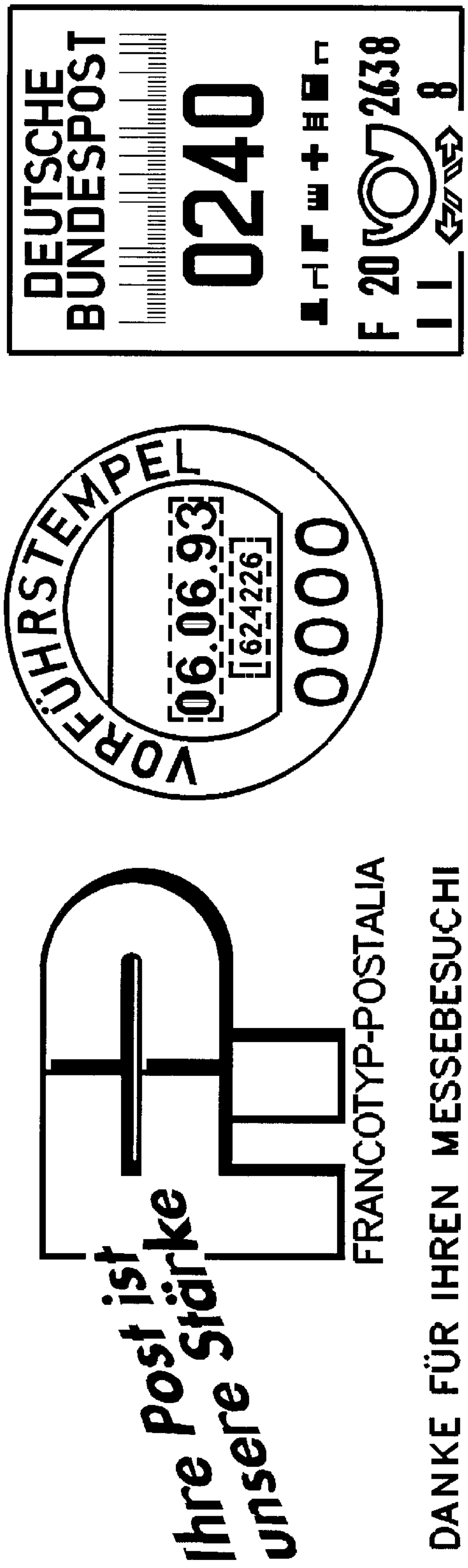

In a fifth example of the security imprint, two further mark fields in FIG. 3*e* are arranged in the postal stamp under and over the widow FE1 for the postage value. The mark field that is arranged in the postage stamp above the window FR1 for the postage value comprises a barcode. For example, the postage value can thus be communicated unencoded but in a machine-readable form. A comparison of the encoded and of the unencoded information can be implemented fully automated since both are machine-readable.

Given a small number of available symbols, more symbol fields must be printed for the same information. A symbol sequence can then ensue either in two lines or in the form of a combination of the versions presented in FIGS. 3*a* through 3*e*.

The mark form can be freely declared with every postal authority. Any general change of the mark format, or of the arrangement of the mark field, is unproblematically possible because of the electronic printing principle.

The arrangement for fast generation of a security imprint for postage meter machines allows a fully electronically produced franking format, that was formed by the microprocessor-controlled printing process from fixed data and current data, to be set.

The data for the constant parts of the franking image, which relate to at least one part of the fixed data, are stored in the first memory area $A_i$ and are identified by an allocated address and the data for the variable parts of the franking image are stored in a second memory area $B_j$, or for marking data in a memory area $B_k$, and are identified by an allocated address.

At predetermined intervals, for example regularly at every inspection of the postage meter machine, a modification or a replacement of the set of symbols shown in FIG. 3*f* can also be undertaken in order to further enhance the protection against forgeries.

FIG. 3*f* shows an illustration of a set of symbols for a mark field, whereby the symbols are shaped in a suitable way so that a machine as well as a visual evaluation by trained personnel in the postal authority are enabled.

A set of symbols that is not contained in the standard character set of standard printers is employed in order to increase the protection against forgery.

The extremely high number of variations enables a version that employs a plurality of symbol sets for the mark.

With a higher information density compared to a barcode, space is inventively saved in the printing of the symbols. It is adequate to distinguish among ten degrees of blackening in order, for example, to achieve a length in the presentation of the information that is shorter by approximately a factor of three in comparison to the zip code. Ten symbols thus arise, whereby their respective degrees of blackening differing by 10%. The degree of blackening can differ by 20% given a reduction to five symbols; however, it is necessary to substantially increase the number of symbol fields to be printed when the same information is to be reproduced as in the case given the set of symbols shown in FIG. 3*f*. A set having a higher number of symbols is also conceivable. The row or rows of symbols are then correspondingly shortened; however, the recognition reliability is likewise correspondingly reduced, so that suitable evaluation means for digital image processing, for example, edge recognition means, are required. Due to the consistent employment of orthogonal edges and avoiding rounded portions, an adequate recognition reliability is already achieved with simple digital image processing algorithms. For example, recognition systems such as employed commercially available CCD line cameras and image processing programs enhanced by commercially available personal computers are suitable.

FIG. 4*a* shows the structure of a combination number KOZ in an advantageous version having a first number (sum of all postage values since the last reloading date), third number (postage value) and a fourth number (produced from a serial number).

A corresponding security imprint evaluation unit 29 for a manual identification shown in FIG. 4*b* includes a computer 26 having a suitable program in the memory 28, and input and output units 25 and 27. The evaluation unit 29 utilized at the respective postal authority is in communication with a data center that is not shown in FIG. 4*b*.

Figure 4C:
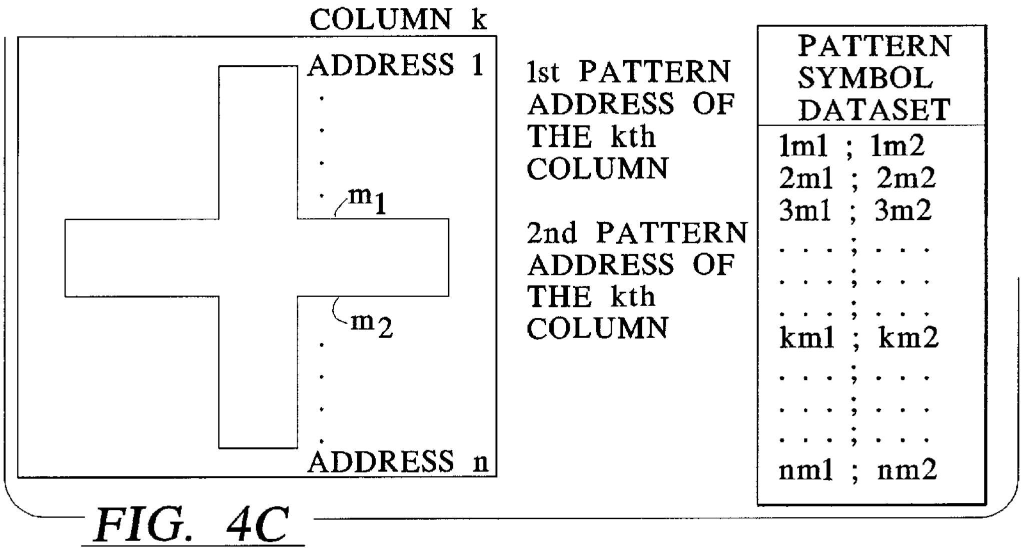
FIG. 4*c* illustrates a sub-step of the mark symbol recognition in accordance with the invention.
Figure 4D:
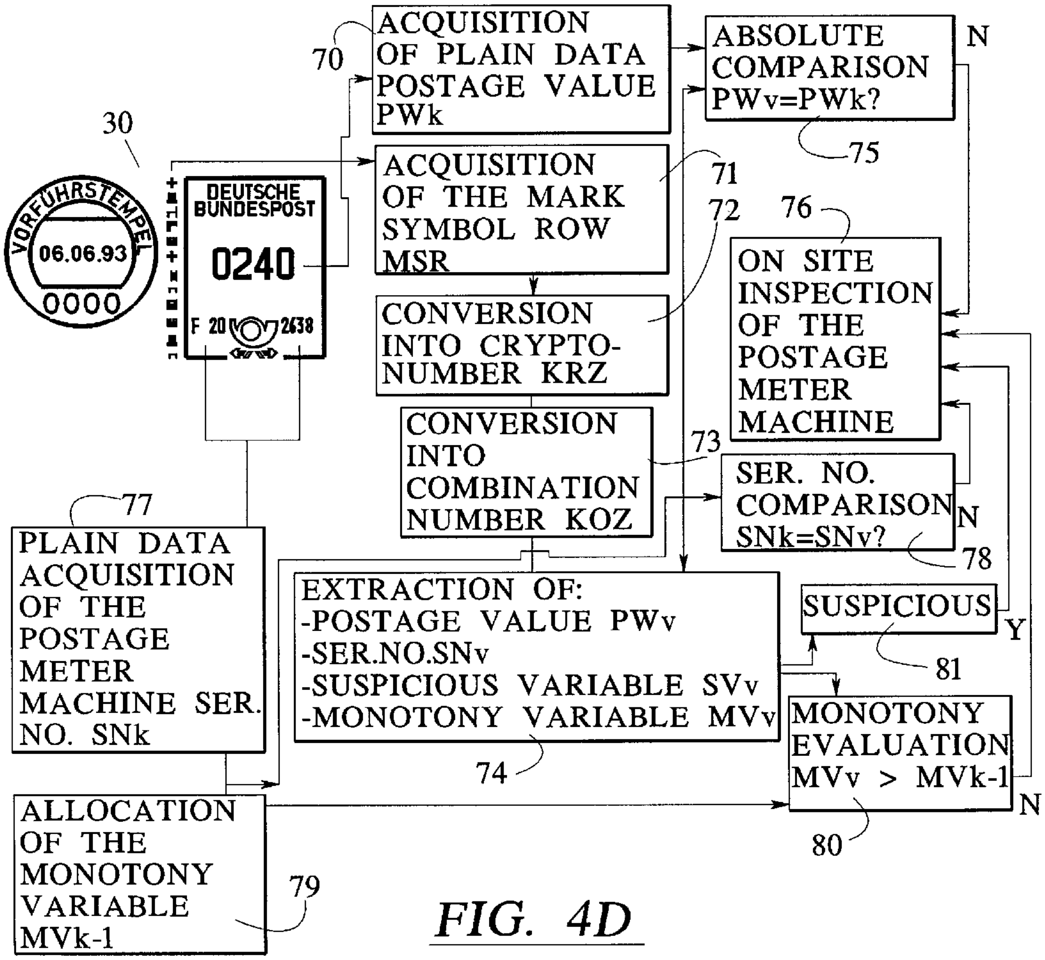
FIG. 4*d* is a flow chart of the security imprint evaluation method of the invention.

A sub-step directed to the recognition of the mark symbol is shown in FIG. 4*c*, this being required for an automatic input according to a security imprint evaluation method set forth in greater detail in FIG. 4*d*.

In the preferred version, the mark field is arranged under or in a field of the postage meter machine stamp and a row of such symbols is printed under the franking stamp imprint simultaneously therewith. As shown, for example, in FIG. 3*b*, the mark field can also be differently arranged, whereby appropriate conveyor devices for the postal matter are respectively provided when the CCD line camera is stationary. A mark reader 24 shown in FIG. 4*b* can also be fashioned as a data pen guided in a guide. The apparatus includes a CCD line camera 241, a comparator 242 connected to the CCD line camera 241 and to a D/A converter, and an encoder 244 for acquiring the step-by-step motion. The data input of the D/A converter 243 for digital data and the outputs of the comparator 242 and encoder 244 are connected to an input/output unit 245. This is a standard interface to the input means 25 of the security imprint evaluation unit 29.

The machine identification of the symbols in the identifier can ensue in two versions:

a) via the integrally measured degree of blackening of each and every symbol, or b) via an edge recognition for symbols.

The orthogonal edges of the symbol set according to FIG. 3 allow an especially simple method of automatic recognition that can implemented with little outlay. The recognition means thereby contains a CCD line camera of medium resolution, for example 256 picture elements. Given a suitable objective, the height of the symbol row is imaged onto the 256 picture elements of the line camera. The respective symbol field is now scanned column-by-column corresponding to a movement of a letter from left to right, beginning with the right-most column. The line camera is preferably stationarily arranged and the letter is moved under the line camera by a uniform speed motor drive. Since, according to a one-time declaration, the symbol row is always positioned at the same location within the franking imprint and the franking imprint is in turn positioned on the envelope according to postal rules that already exist, guiding the envelope at a fixed edge of the recognition device suffices.

The CCD line camera identifies, for each column, the contrast value of the picture elements belonging to that column. The output of the CCD line camera is connected to a comparator that assigns the binary values 1 and 0 to the picture elements on the basis of a threshold comparison. Even given constant, artificial illumination conditions, a matching of the threshold to the extremely different light reflection factors of the various types of paper employed for envelopes will be required. To that end, the threshold is set according to the reference field FE7 that is composed of a sequence of bars and is arranged at the height of, and preceding, the symbol row. The threshold is defined as the average of the light and dark stripes of the reference field. The scanning of the reference field is implemented either with an additional sensor (for example a phototransistor) or with the CCD line camera itself. In the latter instance, the measured values of the line camera must be A/D converted, the threshold must be formed therefrom in a computer connected via a standard interface, and this threshold must be supplied to the comparator via a D/A converter. Recent CCD line cameras have the comparator integrated therein whereby the threshold thereof can be directly controlled by the computer with a digital value.

The binary data supplied by the line camera, including the comparator, are deposited column-by-column and line-by-line in an image store in a computer-enhanced evaluation apparatus. An evaluation program that is simple and fast running investigates the change of the binary data contents from 1 to 0, or 0 to 1, in every column of a symbol field, as was set forth with reference to FIG. 4*c*. When, for example, the program begins to investigate a column of a symbol field with the upper (white) edge, the binary content of these first picture element data is equal to 0. The first change to the binary content 1 (printed) occurs after m1 points of this column. The address of this first binary change and the address m2 of the following binary change (first unprinted picture element) are stored in a feature memory. Given the symbol set shown in FIG. 3*f*, these two contours are already adequate when the operation is repeated for all columns of a symbol field. When a symbol field has n columns, then 2n data are present in the allocated feature memory after the detection thereof, these 2n data enabling an unambiguous allocation by comparison to the data sets of the pattern symbols stored in a pattern memory. Due to its simplicity, this method is real-time operable, and exhibits high redundancy compared to individual printing or sensor errors.

Due to the quantitized degree of blackening difference between the symbols, a simple machine evaluation is enabled without a complicated pattern recognition. A suitably focused photodetector is arranged for this purpose in a reader.

This simple machine evaluation is possible even given envelopes of different colors. A reference value is derived from the reference field in order to compensate different acquired measured values whose differences are based on the different printing condition or paper grades. The reference value is employed for the evaluation of the degree of blackening. A relative insensitivity even in view of malfunctioning printer elements, for example, a thermal ledge in the printer module 1, can be achieved in an advantageous way with the acquired reference value.

The security imprint evaluation method of FIG. 4*d* shows how the security information printed in the franking field is advantageously evaluated. It is necessary to enter individual quantities manually and/or automatically. In this case, the symbol row is vertically arranged between the value stamp and the postmark. In encrypted form, it contains information about the printed postage value, a monotonously variable quantity (for example, the date or an absolute time count), and the information related to the serial number or whether the suspicious mode is present. This information is visually/manually or automatically acquired together with the clear text information.

A first evaluation version according to FIG. 4*d* recovers the individual information from the printed mark and compares this to the information openly printed on the postal matter. The symbol row acquired in step 71 is converted into a corresponding cryptonumber in step 72. This unambiguous (unique) allocation can ensue via a table stored in the memory of the evaluation apparatus, whereby the symbol set in FIG. 3*f* is especially advantageously used, in which case one digit of the cryptonumber then corresponds to each symbol field. The cryptonumber calculated in this way is decrypted in step 73 with the assistance of the cryptokey stored in the evaluation apparatus.

If the cryptonumbers for the mark were generated according to a symmetrical algorithm (for example, the DES algorithm), then the initial number can again be generated from each cryptonumber according to step 73 of the first evaluation version. The initial number is a combination number KOZ and contains the numerical combination of at least two quantities, whereby the one quantity is represented by the upper places of the combination number KOZ and the other quantity is represented by the lower places of the KOZ. That part of the number combination (for example, the postal value) that is to be evaluated is separated and displayed in step 74.

Each place of the initial number obtained after the decryptification has a content significance allocated to it. The information relevant for the further evaluation can thus be separated. When not manipulated the postage value to be actually checked, will form a monotonously, steadily variable quantity which, among other things, is critical. A specific, monotonously, steadily variable quantity and further quantities form specific mark information versions.

Proceeding on the basis of this consideration, the aggregate value of frankings stored in a postage meter machine register forms at least one first number allocated to the predetermined places of the combination number in a first mark information version. This aforementioned first number is a monotonously, steadily variable quantity. As a result, the mark changes at every imprint, making such a franked mailing unmistakable and simultaneously supplying information about the prior credit use. This information about the credit use is checked for its plausibility at time intervals on the basis of known credit use and credit reloading data stored in the central data station. The aggregate value of postage values since the last reloading date preferably forms at least one first number allocated to the predetermined places of the combination number. The second number that is placed at predetermined places of the combination number is formed, for example, by the last reloading date.

In a second mark information version, this aforementioned first number corresponding to the aggregate value of frankings forms a monotonously, steadily variable quantity together with the second number directed to the credit reloading data at the time of the last reloading.

In a third mark information version, this aforementioned first number corresponding to the aggregate value of frankings forms a monotonously, steadily variable quantity together with the second number relating to the item number data at the time of the last reloading.

A corresponding number of alternative versions arises when the remaining value is used for the formation of the mark information instead of the aggregate value of frankings (used postage values since the last credit reloading). The remaining value is derived by subtracting the sum of used postage values from the previously loaded credit.

A corresponding number of further alternative versions is achieved when momentary date/time data overall or since the last reloading date, item number data overall or since the last loading date, or other physical but chronologically determined data (for example, battery voltage) are involved in the formation of the mark information.

In the following exemplary embodiment, the momentary date/time data form a monotonously, steadily variable quantity for a monotony variable $MV_v$ which is separated from the combination number in step 74. The evaluation version then includes the following steps:

(a) The actual (charged) postage value $PW_v$ extracted from the security imprint is compared in step 75 to the postage value TWk printed in the value stamp as clear text and calculated in step 70. When the two do not agree, the printed value stamp was obviously manipulated. In step 76, the requirement for an on site inspection of the postage meter machine is determined and displayed.

(b) The point in time $t_n$ extracted in step 74 is now the monotony variable $MV_v$ separated from the security imprint and unambiguously identifies the point in time at which the postage value was accounted for, or the point in time of the execution of the franking. These data can be composed of the date and of the time of day, whereby the latter is only resolved to such an extent that the next-successive franking differs in terms of its point in time $t_n$ from the preceding point in time $t_{n-1}$. These data can also represent an imaginary time count beginning with a fixed datum=0. The lafter, for example, can be related to the beginning of the operation of the postage meter machine. Every point in time extracted in step 74 as monotony variable $MV_v$ thus unambiguously identifies an individual franking imprint of this postage meter machine and thus makes this unique. Each postage meter machine is characterized by its serial number, this being acquired in step 77. By comparison to one or more earlier imprints of this postage meter machine carried out in step 80, whereby a preceding monotony variable $MV_{k-1}$ allocated stored to the serial number is called in step 79, the aforementioned uniqueness can be checked. Advantageously, the sequence of points in time . . . $t_{n-1}$, $t_n$ of a postage meter machine forms a monotonous series. The monotony then merely has to be checked with reference to the most recently stored point in time $t_{n-1}$ of this postage meter machine. When monotony is not established, a copy of an earlier imprint of this postage meter machine is present, this being displayed in step 76.

(c) In order to check whether the postage meter machine was in the suspicious mode during printing, a suspicious variable $SV_v$ merely has to be interpreted in step 81. When the corresponding digit assumes a specific value or, for example, is odd, this means that this postage meter machine was overdue for credit loading. The determination of the suspicious mode in step 81 and the check for correctness of the serial number in step 78 can be based on an extracted, fourth two-place number which is derived from the serial number in the normal case, i.e. when the postage meter machine is not in the suspicious mode. An OR-operation on the information from the steps 75, 78, 80 and 81 ensues in step 76.

An apparatus such as a laptop computer equipped with an appropriate program is adequate for evaluation. Quantities such as G1 and potentially G4 that may not be derivable from the stamped image of the postage meter machine, and at least one quantity G5 known only to the manufacturer of the postage meter machine and/or to the central data station and communicated to the postal authority, can also be encoded. These are likewise recovered from the mark by the decoding and can then be compared to the quantities stored for particular users. The lists stored in the memory 28 can be updated via a connection to the central data station 21.

The lists produced for every serial number or every user and preferably stored in data banks of the data center for all postage meter machines contain data values for each variable, which are employed for checking the authenticity of a frankings. Thus, the allocation of the symbols to listed significances (and, given another set of symbols not shown in FIG. 3*f*, the allocation of significance and degree of blackening) can be differently defined for different users.

The advantage of an employed symbol set of the recited type is that, dependent on the demands of the respective national postal authority, an identification of an authentic franking stamp via the conceptual content of the symbol is enabled by machine (by, for example integral measurement of the degree of blackening of the symbols) and/or manually in a simple way.

In a second evaluation version that is not shown in FIG. 4*d*, quantities G0, G2, G3 and G4 that are present unencoded in clear text are entered into the evaluation unit 29 by the user either manually or automatically with a reader in order then to derive, first, a cryptonumber and, thereafter, a mark symbol row with the same key and encoding algorithm as are employed in the postage meter machine. Further, in step 45 shown in FIG. 10, a formation of newly coded window data of "type 2" for a mark image is formed. A mark generated therefrom is displayed and is compared by the operator to the mark printed on the postal matter (envelope). The symbolic nature of the marks displayed in the output unit 25 and printed on the postal matter accommodate the comparison to be undertaken by the operator.

In a third evaluation version that is likewise not shown, a trained inspector enters the graphic symbols in sequence into the input unit 25 either manually or automatically with a suitable reader 24 in a first step in order to transform the mark printed on the postal matter (letter) back into at least one first cryptonumber KRZ 1. The actuation elements, particularly the keyboard, of the input unit 25 can be identified with the symbols in order to facilitate the manual entry. In a second step, the quantities that are openly printed and can be derived from the postage meter machine stamp, particularly G0 for the serial number SN of the postage meter machine, G1 for the advertising slogan frame number WRN, G2 for the date DAT and G3 for the postal value PV, G4 for non-repeating time data ZEIT as well as at least one quantity G5 INS known only to the manufacturer of the postage meter machine and/or to the data center and communicated to the postal authority,are at least partially employed in order to form at least one comparative cryptonumber VKRZ1. The check ensues in a third step by comparing two cryptonumbers KRZ1 to VKRZ1 in the computer 26 of the evaluation unit 29, whereby a signal for authorization is output given equality, or non-authorization is output given a negative comparison result (inequality).

An evaluation according to the second or third evaluation version shall be set forth in greater detail in the exemplary embodiment set forth below.

The first quantity G1 is the advertising slogan frame number WRN that the inspector recognizes from the postage meter stamp. In addition to being known to the user, this first quantity is also known to the manufacturer of the postage meter machine and/or to the data center and is communicated to the postal authority. In one version, preferably having a data connection to the central data station, the advertising slogan frames $WR_n$ belonging to the serial number SN of the respective postage meter machine are displayed on a picture screen on the data output unit 27 together with allocated numbers $WRN_n$. The inspector undertakes the comparison with the advertising slogan frame $WR_b$ employed on the latter, entering the number $WRN_n$ identified in this way.

The stored lists transmitted from the central data station into the memory 28 contain, first, the current allocation of the parts of the advertising slogan frame WRNT to a second quantity G2 (for example, the date DAT) and, second, contain the allocation of symbol lists to a third quantity G3 (for example, the postage value PW). In addition, a list of parts SNT of the serial number SN selected by the first quantity G1, particularly the advertising slogan frame number WRN, can be present. User-associated information such as, for example, the advertising slogan frame number WRN, can be utilized for a manual, spot check evaluation of the mark because the decoder lists are selectable dependent on the user-associated information, these decoder lists containing corresponding data sets. That byte which is employed in generating the combination number is then identified from the data set with the quantity G2 (DAT).

In the preferred version, a monotony test is employed, first, for checking the uniqueness of the imprint. The inspector takes the serial number SN from the windows FE2 and FE3 of the imprint and identifies the user of the postage meter machine. The advertising slogan number can thereby be additionally employed, since this is usually allocated to specific cost centers when one and the same machine is used by different users. Data from the last examination, also including data from the last inspection, are entered into the aforementioned lists. For example, such data are the item count if the machine has an absolute item counter available, or the absolute time data if the machine has such an absolute time counter available.

The correctness of the printed postage value is checked in the first inspection step in conformity with the valid stipulations of the postal authority. Subsequent manipulations at the value imprint undertaken with fraudulent intent can thus be identified. In the second inspection step, the monotony of the data, particularly of those in the window FR8, is checked. Copies of a franking stamp can thus be identified. A manipulation for the purpose of forgery is therefore not likely since these data are additionally printed in at least one mark field in the form of an encrypted symbol row. Given an absolute time or item count, the number that is indicated in the window FE8 must have incremented in the imprint since the last inspection. Nine digits are presented in the window FE8, allowing the presentation of a time span of approximately thirty years with a resolution of seconds. The counter would overflow only after this time. These quantities can be recovered from the mark in order to compare them to the unencoded quantities printed openly. In a third, optional inspection step, the other quantities, particularly the serial number SN of the postage meter machine, and possibly the cost center of the user, can be checked and identified when a manipulation is suspected. The information such as the advertising slogan frame number WRN can be recited by a predetermined window FR9. The relevant window data are type 1, i.e. they vary less frequently than window data of type 2 such as, for example, the time data in the window FE8 and the mark data in the window FE6.

In a further embodiment, the data of the windows FE8 and FE9 are not openly printed unencoded but are only employed for encoding. The windows FE8 and FE9 shown in FIG. 3*a* are therefore absent from the postage meter machine print formats shown in FIGS. 3*b* through 3*e* in order to illustrate this version.

In a preferred input version for the inspection, the temporarily variable quantities to be entered, for example the advertising slogan frame number WRN, the date DAT, the postage valve PW, time data ZEIT and the serial number SN, are automatically respectively detected from the corresponding field of the postage meter machine stamp with a reader 24 and are read in. It is therefore necessary that the arrangement of the windows in the postage meter machine imprint is thereby to be maintained in a predetermined way.

Other temporarily variable quantities allocated to the respective serial number SN are only known to the manufacturer of the postage meter machine and/or to the data center and are communicated to the postal authority. For example, the defined item count of frankings reached at the last inspection serves as a fifth quantity G5.

All quantities to be entered except quantities G1, G4 and G5 must be capable of being derived from the individual windows $FE_j$ of the postage meter machine stamp. The quantity G5, for example, forms the key for the encoding that is modified at predetermined, chronological intervals, i.e. after every inspection of the postage meter machine. These chronological intervals are dimensioned such that, even using modem analysis methods, for example differential cryptoanalysis, it is certain that one will not succeed in reconstructing the original information from the marks in the mark field in order to subsequently produce forged franking stamp images.

The quantity G1, for example, corresponds to an advertising slogan frame number. Corresponding numerical chains (strings) for window or frame input data are stored in the sub-memory areas $ST_i$, $ST_j$ of the main memory 5 of the postage meter machine.

For example, the window data stored in the sub-memory areas $ST_j$ of the main memory 5 of the postage meter machine correspond to the quantities G0, G2 and G3, whereas the quantity G0 in the windows FE2 and FE3 is derived from the sub-memory areas $T_2$ and $T_3$, the quantity G2 in the window FE4 is derived from the sub-memory area $T_4$, and the quantity G3 in the window FE1 is derived from the sub-memory area $ST_1$.

The stored window data for an advertising slogan text part, a mark field, and possibly for a reference field are present in the sub-memory areas $B_5$, $B_6$ and $B_7$ of the main memory 5 of the postage meter machine, which contains $B_k$ sub-areas. It should be noted that the window data are more frequently written into and/or read out from some of the sub-memory areas of the main memory 5 of the postage meter machine than others. When the non-volatile main memory is an EEPROM, a special memory method can be employed in order to be sure to remain below the limit number of memory cycles that is permitted for such memories. Alternatively, a battery-supported RAM can also be employed for the non-volatile main memory 5.

Figure 5:
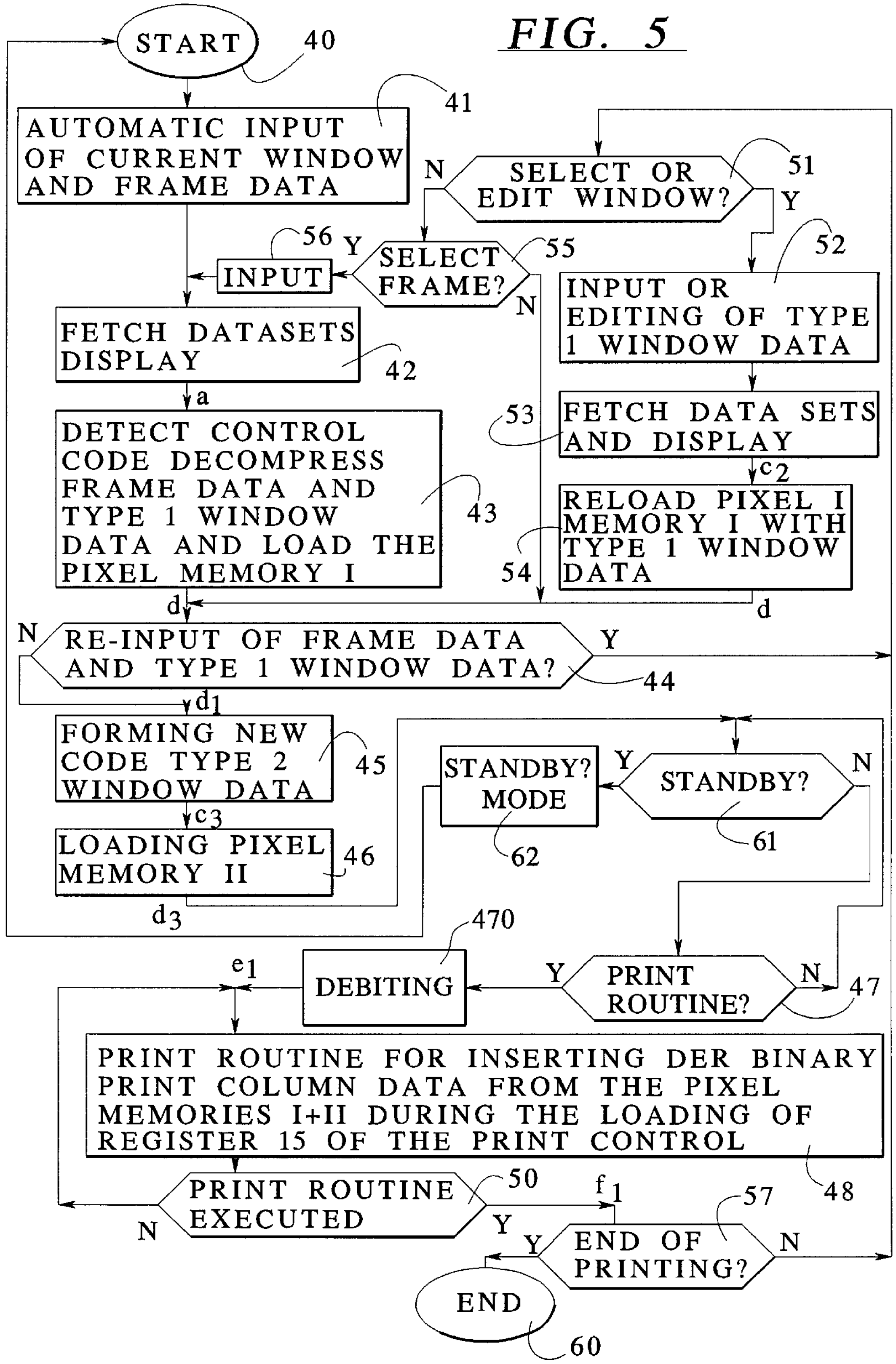
FIG. 5 is a flow chart for producing the print format according to the first version of the postage meter machine of the invention having two pixel memory areas.

FIG. 5 shows a flow chart of the solution of the invention based on the presence of two pixel memory areas shown in FIG. 1.

Corresponding to the frequency of modification of the data, decoded binary frame and window data are stored in two pixel memory areas before printing. The semi-variable window data of type 1 that are not to be frequently modified, such as date, serial number of the postage meter machine, and the slogan text part selected for a plurality of imprints, can be decompressed into binary data together with the frame data before printing and can be composed to form a pixel image stored in the pixel memory are I. By contrast, constantly changing variable window data of type 2 are decompressed and are stored in the second pixel memory area II as binary window data before printing. Window data of type 2 are the printable postage value, dependent on postal matter and delivery, and/or the constantly changing mark. Following a print request, the binary pixel data from the pixel memory areas I and II are combined to form a print column control signal during the course of a printing routine during the printing of each column of the print format.

After being switched on and after its initialization, a postage meter machine can run through several statuses (communication mode, test mode, franking mode and similar modes), this being disclosed in greater detail in German Patent Application 43 44 476.8, and in German OS 42 17 830. After the start step 40 of the franking mode, an automatic input of the most recent, currently stored window and frame data ensues on the basis of the input of the cost center in step 41 and a corresponding display ensues in step 42. Relevant memory areas C, D, E of the non-volatile main memory 5 are also interrogated with respect to an allocation of window and frame data or cost center that has been set. According to the aforementioned method or in another method disclosed, for example, in German OS 42 21 270, an advertising text part that is allocated to a specific advertising imprint can also be automatically prescribed.

In step 43, frame data are transferred into registers 100, 110, 120, . . . of the volatile main memory 7*a* and the control code is thereby detected and is stored in the volatile main memory 7*b*. The remaining frame data are decompressed and are stored in the volatile pixel memory 7*c* as binary pixel data. Likewise, the window data are loaded into registers 200, 210, 220, . . . of the volatile main memory 7*a* and the control code is thereby detected and stored in the volatile main memory 7*b*, and the remaining window data are correspondingly stored column-by-column in the volatile pixel memory 7*c* after they are decompressed.

Figure 9A:
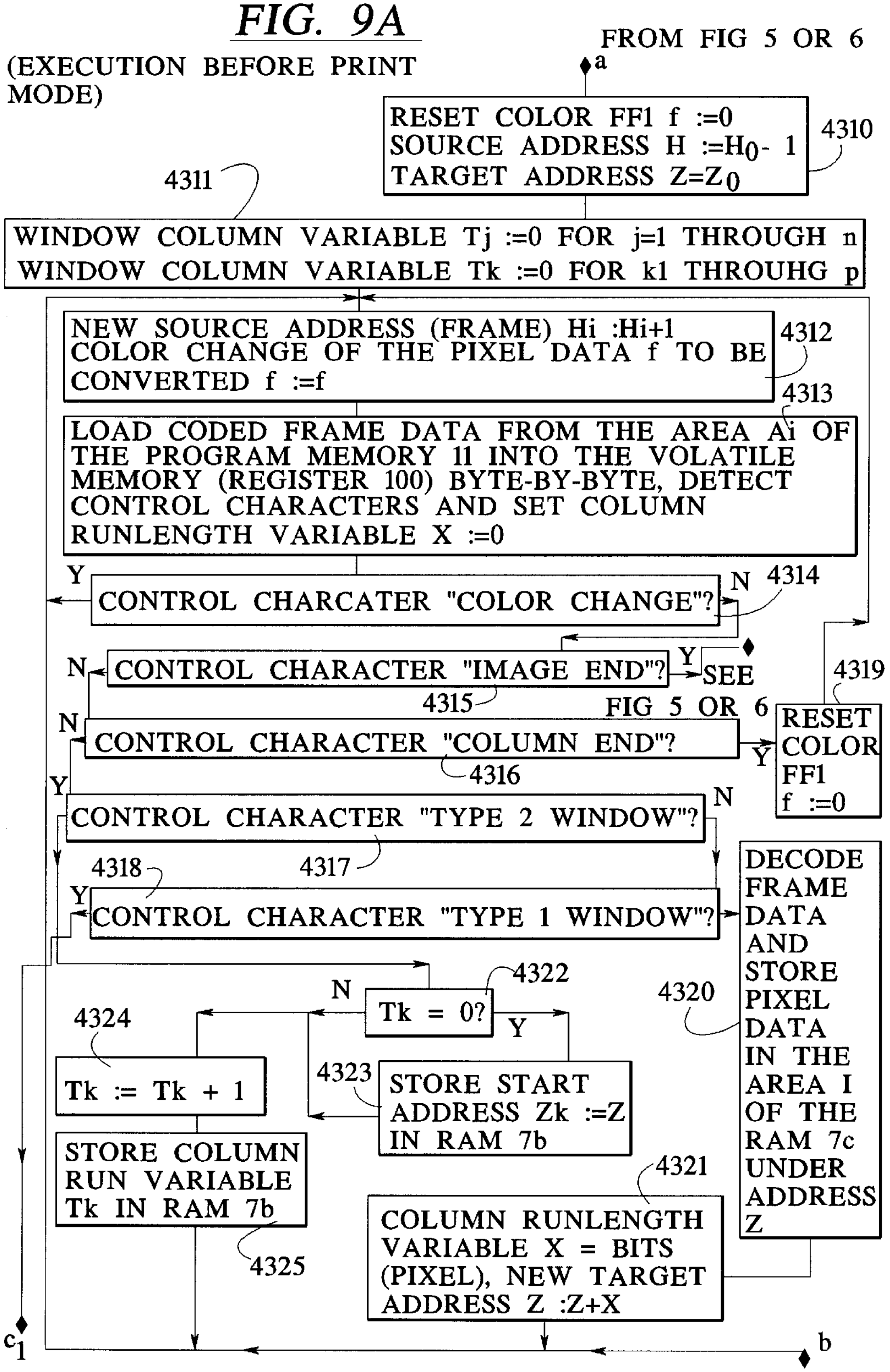
FIG. 9*a* is a flow chart illustrating decoding of the control code, decompression and loading of the fixed frame data as well as formation and storing of the window characteristics in accordance with the invention.

The decoding of the control code, decompressing, and the loading of the fixed frame data as well as the formation and storing of the window identifiers are shown in detail in FIG. 9*a*. The embedding of decompressed, current window data of type 1 into the decompressed frame data after the start of the postage meter machine, or after the editing of frame data, are shown in detail in FIG. 9*b*.

In step 44, either the decompressed frame and window data of type 1 are stored as binary pixel data in the pixel memory are I and can be further-processed in step 45 or a re-entry of frame and/or window ensues. In the latter instance, a branch is made to step 51.

In step 51, the microprocessor determines whether an input has ensued via the input unit 2 in order to replace window data, for example for the postage value, with new window data or in order to replace or to edit window data, for example for a slogan text line. When such an input has ensued, the required sub-steps for the inputs are implemented in step 52, i.e. a complete, other data set is selected (slogan text parts) and/or a new data set is produced that contains the data for the individual characters (numerals and/or letters) of the input quantity.

In step 53, corresponding data sets are called in for a display for checking the input data and are offered for the following step 54 for reloading the pixel memory are I with the window data of type 1.

Figure 9B:
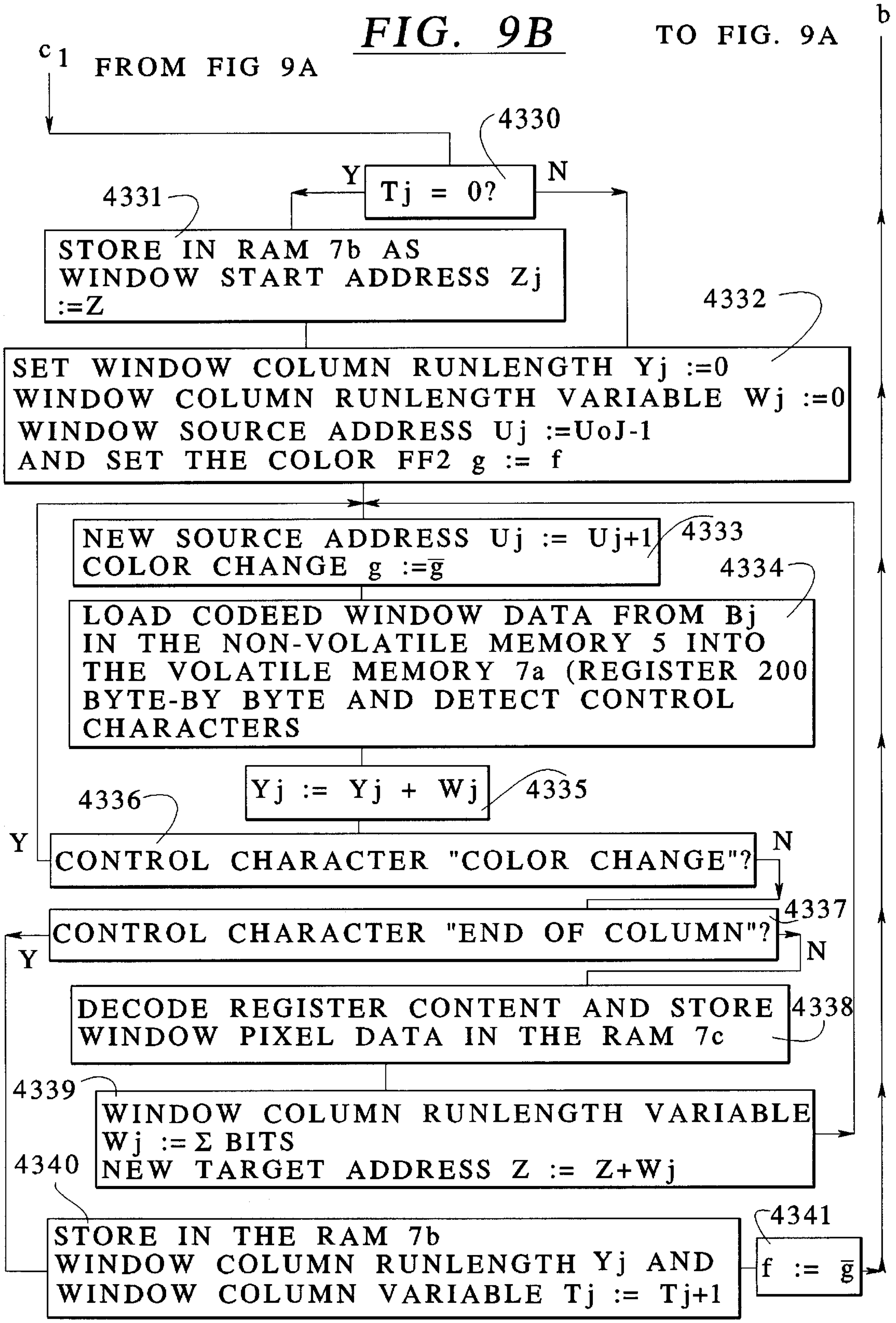
FIG. 9*b* is a flow chart illustrating embedding of decompressed, current window data of type 1 into the decompressed frame data after the start of the postage meter machine, or after the editing of frame data in accordance with the invention.
Figure 9C:
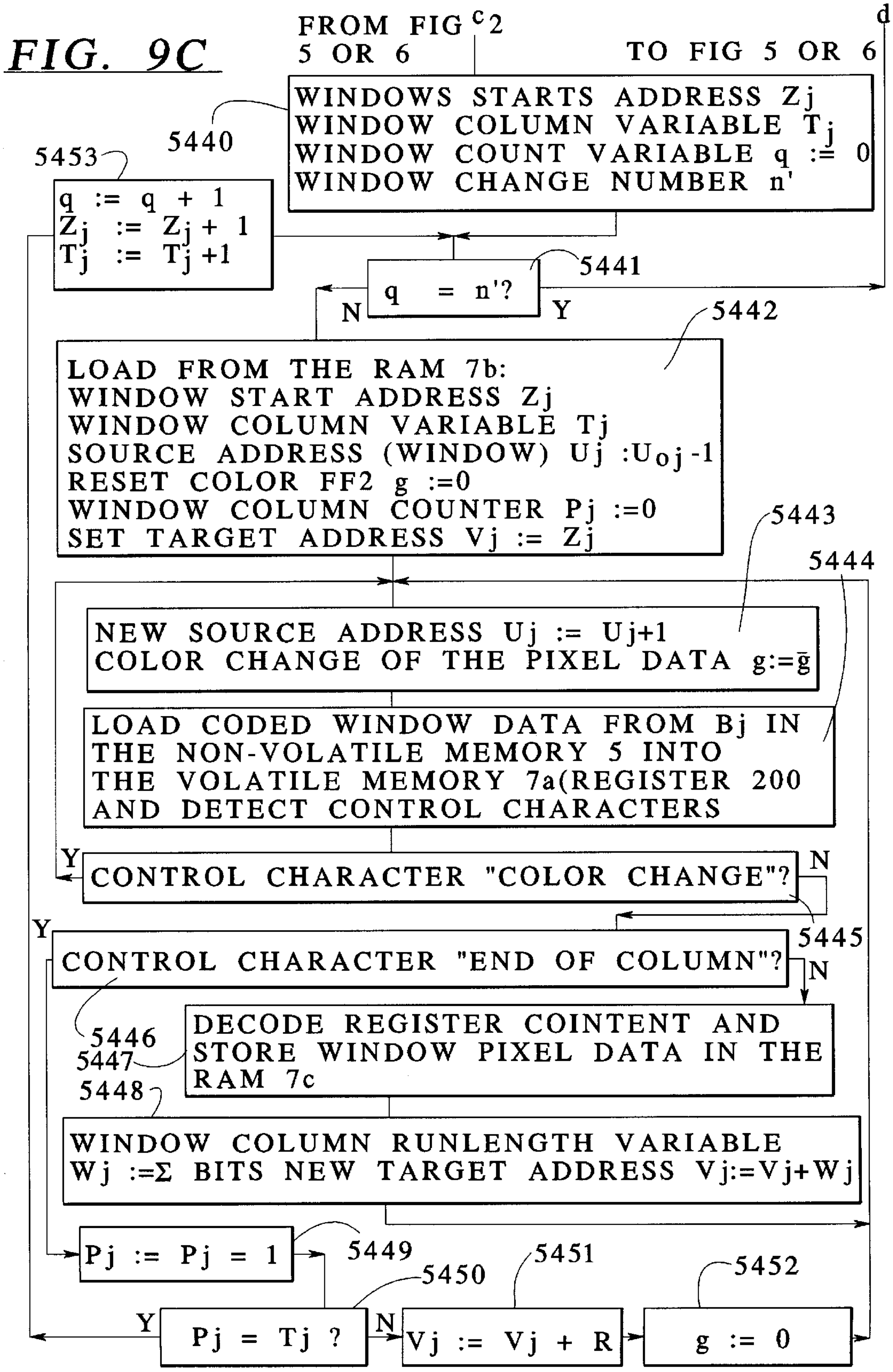
FIG. 9*c* is a flow chart illustrating embedding of decompressed, variable window data of type 1 into the decompressed frame data after the editing of the window data of type 1 in accordance with the invention.

The step 54 for embedding decompressed, variable window data of type 1 into the decompressed frame data following a re-entry or following the editing of these window data of type 1 is shown in detail in FIG. 9*c*. The data of data sets called in according to the input are evaluated in order to detect a control code for a "color change", or for a "column end", which are required for an embedding of the newly entered window data. Those data that are not a control code are then decompressed into binary window pixel data and are embedded column-by-column into the pixel memory area I.

When, by contrast, it is found in step 51 that no window data are to be selected or edited, then a branch is made to step 55. In step 55, the possibility for changing the fixed advertising slogan or frame data leads to a step 56 in order to implement the entry of the currently selected frame data sets together with the window data sets. Otherwise, a branch is made to step 44.

When a new entry of selected, specific quantities is to ensue, a flag is set in step 44 and is taken into consideration in the following step 45 for the formation of data for a new mark symbol sequence, in case a step 45*b* is to be run according to a second version.

In step 45, a formation of the newly coded window data of type 2 ensues. Preferably, the mark data for a window FE6 are generated here, with preceding steps of encoding data for producing a cryptonumber being included. A shaping as a barcode and/or symbol chain is also provided in this step 45. The formation of newly coded window data of type 2 for a mark image is set forth in two versions with reference to FIG. 10. In a first version, a monotonously variable quantity is processed in a step 45*a*, so that, ultimately, every imprint becomes unique due to the printed mark symbol sequence. In a second version, other quantities are also processed in a step 45*b* preceding the step 45*a*.

The correspondingly formed data set for the mark data is subsequently loaded in a region F and/or at least in sub-memory $B_6$ of the non-volatile main memory 5 and thereby overwrites the previously stored data set for which window characteristics were calculated or were predetermined and which are only now entered into the volatile main memory 7*b*. The sub-memory $B_{10}$ is preferably provided for a data set that leads to the printing of a second mark symbol sequence, as shown in FIGS. 3*c* and 3*d*. Moreover, double symbol sequences can be printed next to one another in a way that is not shown in FIG. 3*b*. The area F is preferably provided for a data set that leads to the printing of a barcode, as shown in FIG. 3*e*.

A byte-by-byte transmission of the data of the data set for the mark ensues into registers of the volatile main memory 7*a* in step 46, as does a detection of the control characters "color change" and "column end" in order then to decode the remaining data of the data set and in order to load the decoded, binary window pixel data of type 2 into the pixel memory area II of the volatile main memory 7*c*. The decoding of control code and conversion into decompressed, binary window data of type 2 is shown in detail in FIG. 11. Such window data of type 2 are particularly identified with the index k and relate to the data for the window FE6, possibly the window FE10 for mark data, and, possibly the window FE8 for the ZEIT data of the absolute time count. The time data represent a monotonously variable quantity since this data ascends time-dependent. Time data that are still initially BCD packed and are supplied from the clock/date module 8 are converted and arranged into a data set containing suitable ZEIT data and having run-length-coded hexadecimal data. They can now likewise be store in a memory area $B_8$ for window data FE8 of type 2 and/or can be immediately loaded column-by-column into registers 200 of the main memory 7*a* or into the print register 15 in step 46.

In step 47 a determination is made at to whether there is a print request, the routine may entered into a waiting loop if a print request has not yet ensued. In one embodiment, the waiting loop is directly conducted back to the start of the step 47 in the way shown in FIGS. 5 or respectively 6. In another embodiment (not shown), the waiting loop is conducted back to the start of the step 44 or 45.

Figure 12:
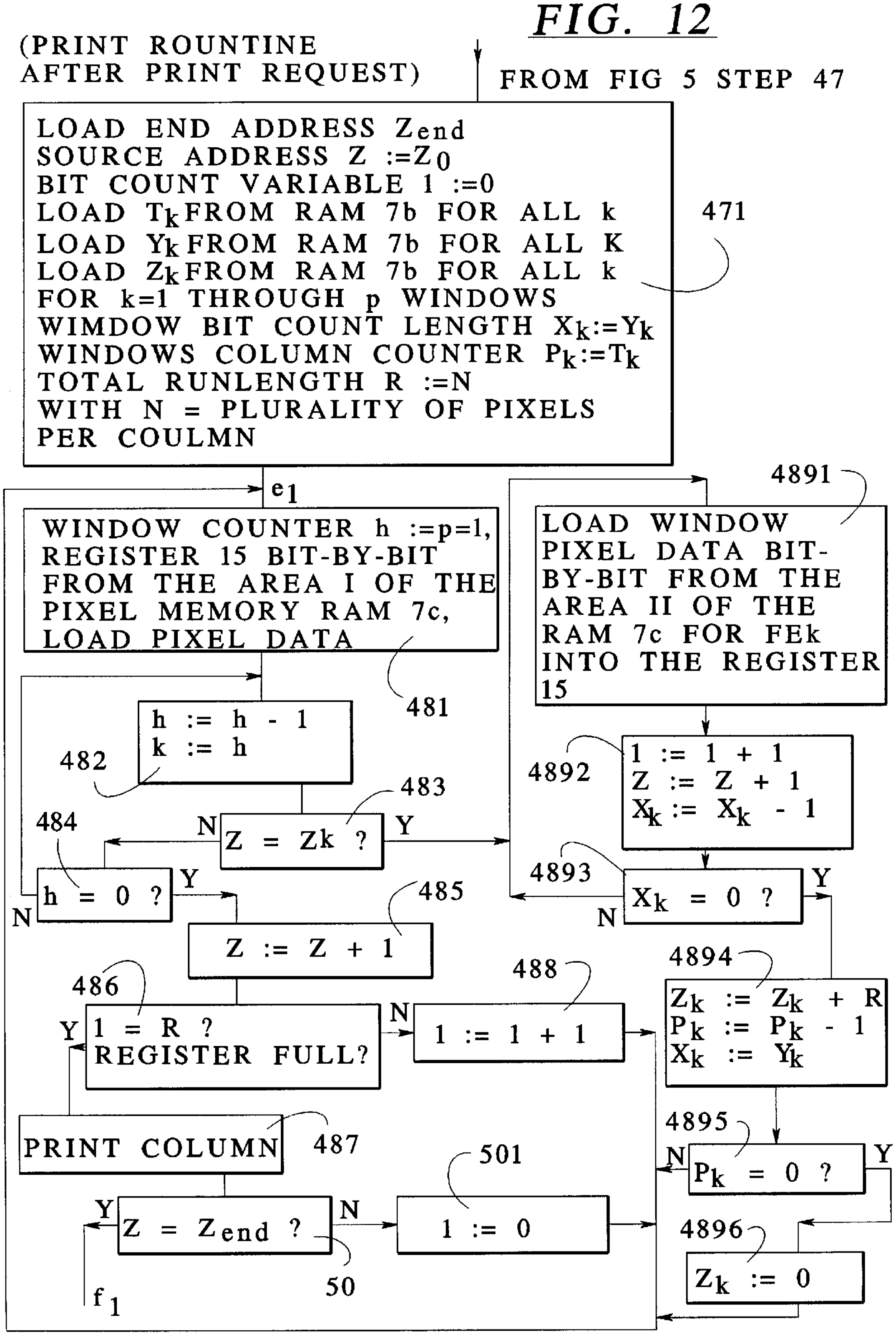
FIG. 12 is a flow chart illustrating a print routine for the combining of data from the pixel memory areas I and II in accordance with the invention.

The printing routine shown in detail in FIG. 12 and implemented in step 48 for the combining of print column data from the pixel memory areas I and II ensues during the loading of the print register 15. The print control 14 effects a printing of the loaded print column immediately after the loading of the printing register 15. Subsequently, a check is made in step 50 to determine whether all columns for a postage meter machine print format are printed, by comparing the running address Z to the stored end address $Z_{end}$. When the printing routine for a mailing has been implemented, a return is made to step 57. Otherwise, a branch is made back to step 48 in order to produce and print the next printing column, until the printing routine has been ended.

When the printing routine has ended, a check is made in step 57 to determine whether further mailings are to be franked. If there are not further items, the franking is ended in step 60. Otherwise, the end of printing has not yet been reached and a return is made back to step 51.

Figure 6:
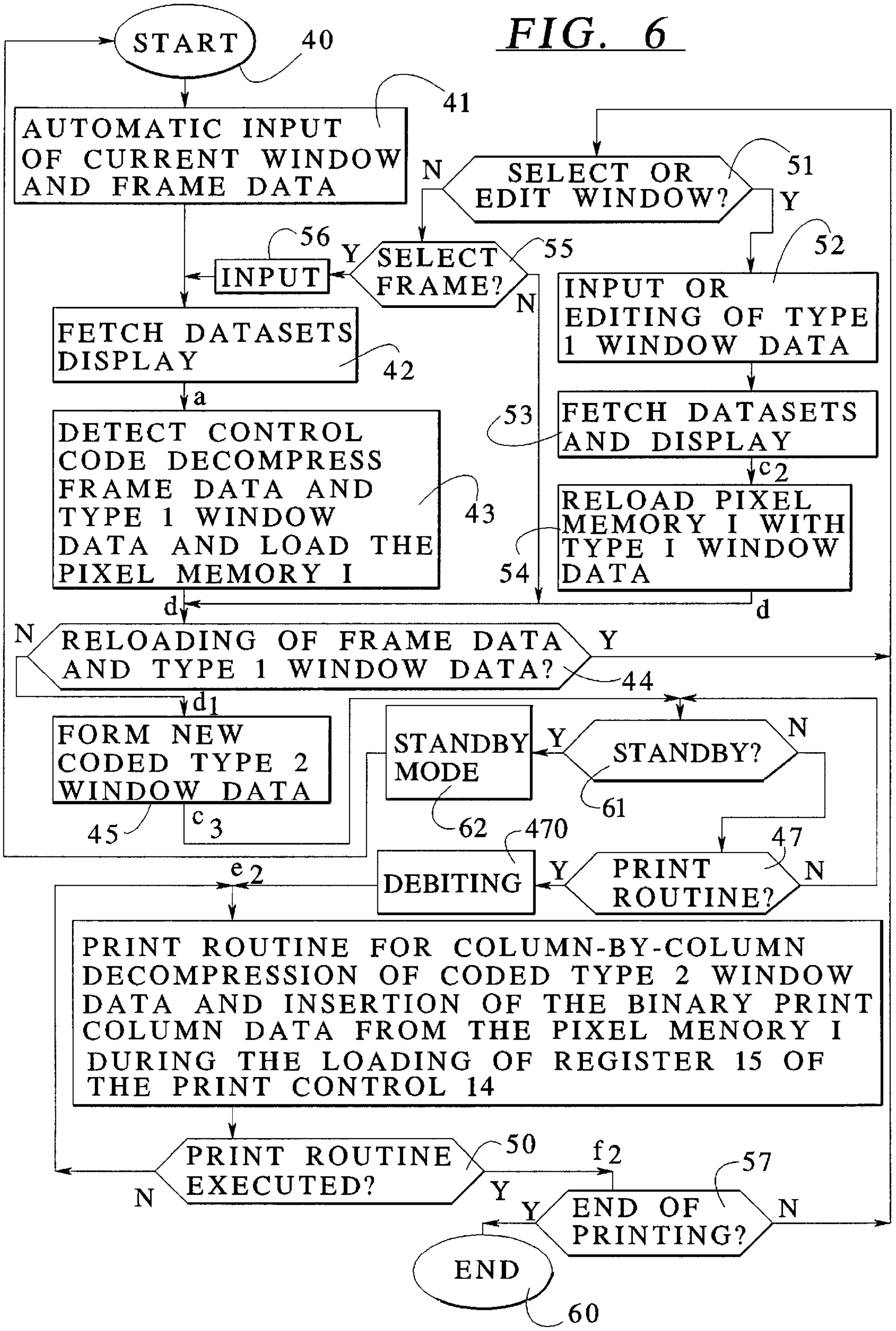
FIG. 6 is a flow chart of a second version of the postage meter machine of the invention having one pixel memory area.

FIG. 6 shows a fourth version of the inventive solution, wherein, deviating from the block circuit diagram of FIG. 1, only one pixel memory area I is employed. Decoded, binary frame data and window data of type 1 are combined and stored before the printing in this pixel memory area I. The steps up to step 46, which is eliminated in this version according to FIG. 6, and step 48, which is replaced by step 49, are identical. Essentially, the same sequence in the execution occurs up to step 46.

Figure 13:
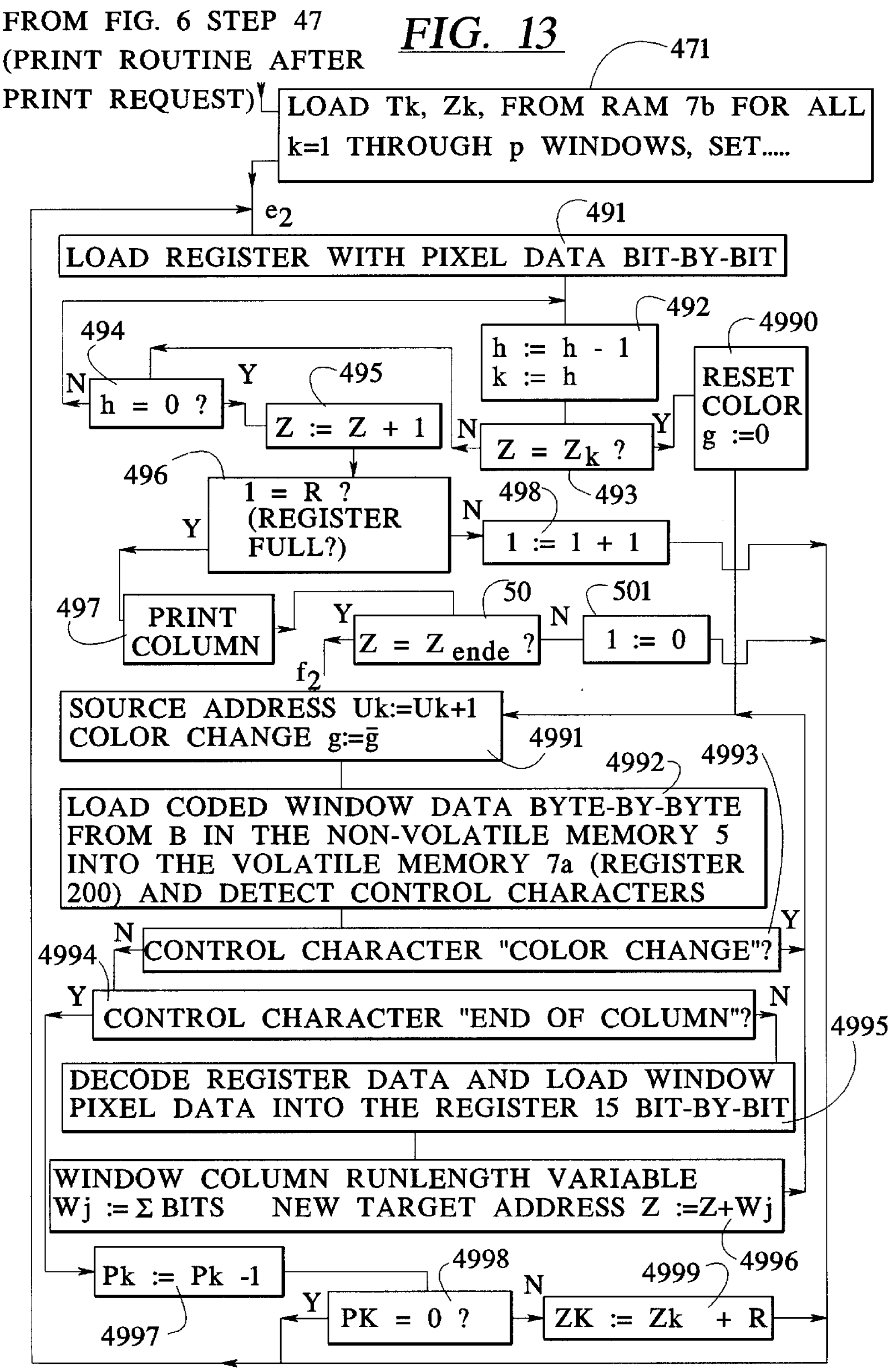
FIG. 13 is a flow chart illustrating a print routine for the combining of data taken from a pixel memory area I and from main memory areas in accordance with the invention.

The printing routine for the combination of data taken from a pixel memory area I and from the main memory areas is discussed in greater detail in connection with FIG. 13. The constantly changing window data of type 2 are decompressed in step 49 during the printing of each column and are combined with the binary pixel data from the pixel memory area I to be printed column-by-column to form a print column control signal. Window data of type 2, for example, are the printable postage value dependent on postal matter and delivery, and/or the constant changing mark.

Figure 7:
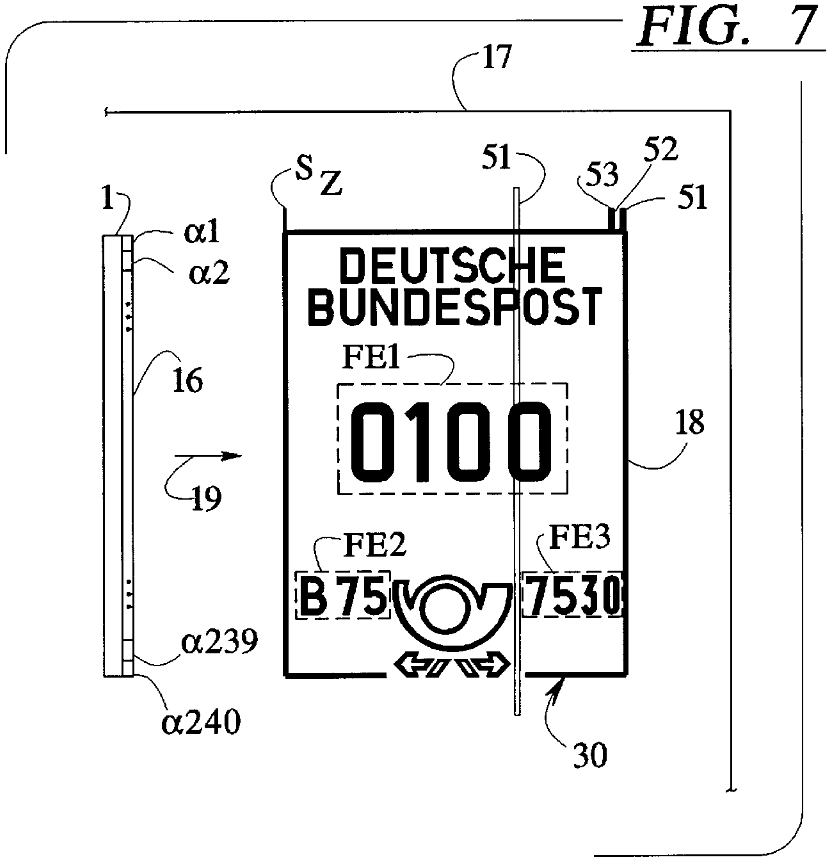
FIG. 7 illustrates a character format of the postage value with allocated printing columns in accordance with the invention.

With reference to a postage value character image shown in FIG. 7 and the data of the print control signal allocated to a printing column, the production thereof from the frame and window data shall be set forth.

An envelope 17 is moved under the printer module 1 of an electronic postage meter machine with the speed v in the direction of the arrow and is thereby printed column-by-column with the illustrated postal value character image laster-like, beginning in column $s_1$. The printer module 1, for example, has a printing ledge 16 having a row of printer elements d1 through d240. The ink jet or a thermal transfer printing principle, for example the ETR printing principle (Electroresistive Thermal Transfer Ribbon) can be utilized for the printing.

A column $s_f$ to be printed at the moment constitutes one column in a character image that is composed of colored printing dots and "non-colored" (absent) printing dots. Each printer element is capable of printing one colored printing dot; the "non-colored" printing dots are simply the absence of a dot at a given location. The first two printing dots in the printing column $s_f$ are colored in order to print the frame 18 of the postal value character image 30 Fifteen non-colored (i.e. inactive) and three colored (i.e. active) printing dots then follow in alternation until a first windows FE1 is reached wherein the postal value (postage) is to be inserted. This is followed by a region of 104 non-colored printing dots up to the column end. Such a run-length coding is realized in the data set with hexadecimal numbers. The need for memory space is thereby minimized by compressing all data in this manner.

256 bits can be produced with hexadecimal data "QQ". When the required control code bits are subtracted therefrom, fewer than 256 bits remain for driving the means that produces the dots.

When, however, a control character "00" that effects a color change is additionally employed, even more than 256 dots can be driven, however, more memory capacity is required in the sub-memory area $A_i$ of the main memory 5. The exemplary embodiments of FIGS. 9, 11, 12 and 13 are designed for such a high-resolution printer module.

Control characters have a value "00" for color change. A following hexadecimal number thus continues to be interpreted as colored (f:=1), that would otherwise be considered non-colored. A reset color flip flop (f:=1) is set given a color change (f:=1) and is switched again at the next color change (f:=1). 256 dots or more can thus be addressed with this principle. The register 15 in the printer control 14 is loaded bit-by-bit from the pixel memory (for example, a printing column having N=240 dots).

Further control characters are "FE" for column end, "FF" for image end, "F1" for the beginning of the window of the first window FE1, etc.

In the following example selected for explaining FIG. 7, less memory capacity in the ROM is required compared to a driveable printing column having more than 240 dots, since the control characters are beneficially placed. For hexadecimal data "01", "02", . . . "QQ", . . . "F0", 1 through 240 dots can be driven ("F0"=["F"·$16^1$]+["0"·$16^0$]=[15·16]+[0·1]=240).

The control code "00" for color change can be theoretically eliminated here since an entire printing column of 240 dots having an identical coloration can be completely defined with a single hexadecimal number "F0". Given only insignificant additional memory capacity, a color change can nonetheless also be meaningful given a plurality of windows in one column.

According to this method, a data set for the printing column $s_f$ arises in the form of which the following is an excerpt:

. . . "2","0D","02","4F","F1","68","FE", . . . .

Upon transfer into a register 100 of the new P controller 6, control characters are detected from hexadecimal numbers "QQ" and are interpreted in a step 43.

In this interpretation, window characteristics $Z_j$, $T_j$, $Y_j$ or $Z_k$, $T_k$, $Y_k$, are also generated and are stored in the volatile memory RAM space 7*b* together with defined values for the starting address $Z_0$, ending address $Z_{end}$ and the overall run length R, i.e. the number of binary data required per printing column.

A maximum of thirteen windows can be called in and the starting addresses can be defined for the thirteen control characters "F1" through "FD". For example, a starting address $Z_6$ can be calculated and stored as a window characteristic with "F6" for the window beginning of a window FE6 of type 2.

Figure 8:
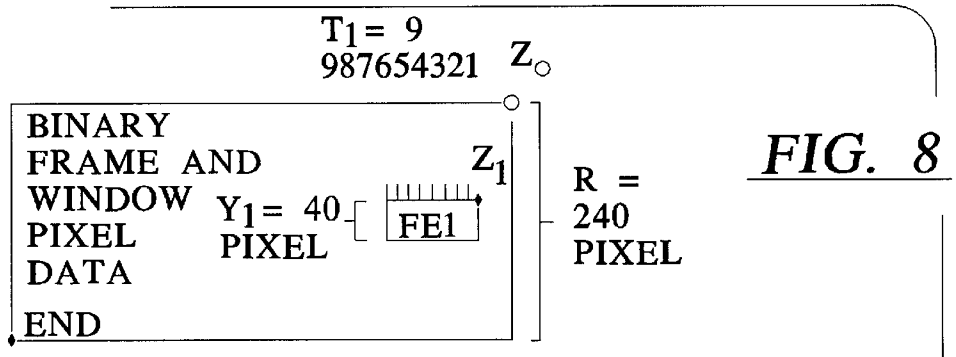
FIG. 8 is an illustration of the window characteristics related to a pixel memory image, and stored separated therefrom in accordance with the invention.

FIG. 8 shows an illustration of the window characteristics for a first window FE1 related to a pixel memory image and stored separately therefrom. The window has a window column run length $Y_1$=pixels and a column number of approximately 120 that are stored as window column variable $T_1$. When the window starting address Z is stored as a destination address, the position of the window FE1 in the binary pixel image can be reconstructed at any time.

Binary data converted from the registers 100 and 200 are read bit-by-bit into the volatile pixel memory RAM space 7*c*, with an address allocated to every bit. When the hexadecimal loaded in the register is a detected control character "F2", the window characteristic $Z_j$ is defined for a starting address of the window having number j=2 given a total of n windows. Window data can thus be inserted again at a later time into the frame data at this location characterized by the address. The window column run length $T_j$<R is the overall run length of the printing column. The new address in the same line but in the next column can be generated from the addition with R.

FIG. 9*a* shows the decoding of the control code, decompression and loading of the fixed frame data, as well as the formation and storing of the window characteristics. A control code "color change" was thereby taken into consideration for producing extremely high-resolution printing. A color flip flop FF1 is thus to be reset to f:=0 in a first sub-step 4310. Let the source address $H_i$ for locating the frame data be initially $H_i$:=$H_j$−1 and let the destination address be Z:=$Z_0$.

In the sub-step 4311, the window column variable $T_j$:=0 for j=1 through n windows and for the window data of type 2, the window column variable $T_k$:=0 for k=1 through p windows are set for the window data for type 1. In sub-step 4312, the source address $H_i$ for frame data is incremented and a color change is made so that the starting data byte is interpreted, for example, as colored, this later leading to correspondingly activated printer elements.

The aforementioned byte, which is a run length-coded hexadecimal number for frame data, is now transferred into a register 100 of the volatile memory 7*a* in sub-step 4313 from the corresponding area $H_i$ of the non-volatile memory 5 automatically selected by the cost center KST. Control characters are detected and a run length variable X is reset to 0.

In sub-step 4314, a control character "00" for a color change is recognized; after branch back onto the sub-step 4312, this leads to a color change, i.e. the next run length-coded hexadecimal number effects an inactivation of the printer elements corresponding to the run length. Otherwise, a determination is made in sub-step 4315 as to whether a control character "FF" for image and is present. When such a control character "FF" is recognized, the point d according to FIGS. 5 or 6 is reached and the step 43 has been executed.

If such a control character "FF" for image end is not recognized in sub-step 4315, a check is made in sub-step 4316 to determine whether a control character "FE" for a column end is present. If such a control character "FE" is recognized, the color flip flop FF1 is reset in sub-step 4319 and a branch is made to sub-step 4312 in order to then load the byte for the next printing column in sub-step 4313. If no end of column character is present, a determination is made in sub-step 4317 as to whether a control character for a window of type 2 is present. If such a control character is recognized, a branch is made to sub-step 43222. Otherwise, a check is made in sub-step 4318 to determine whether a control character for windows of type 1 is present. If so, a point $c_1$ is reached at which a step 43*b* shown in FIG. 9*b* is implemented.

If no control character for type 1 window data is recognized in sub-step 4318, then the run length-coded frame data are present in the byte that has been called in. These data are decoded in sub-step 4320 and are converted into binary frame pixel data, and are stored in the pixel memory area I of the pixel memory 7*c* under the address Z that has been set. In the following sub-step 4321, the column run length variable X is determined according to the number of converted bits, and subsequently the destination address for the pixel memory area I is raised by this variable X. A point b has thus been reached and a branch is made back to sub-step 4312 in order to call in a new byte.

If a control character for type 2 window data were present in sub-step 4322, the executed storing of window characteristic $T_k$ is identified. When a window characteristic, the window column run variable $T_k$ in this case, is still at the initial value 0, the window starting address $Z_k$ corresponding to the address Z is identified in a sub-step 4323 and is stored in the volatile main memory 7*b*. Otherwise, a branch is made to sub-step 4324. The sub-step 4323 is likewise followed by the sub-step 4324 in which the window characteristic of the window column variable $T_k$ is incremented. In the following sub-step 4325, the previous window column variable $T_k$ stored in the volatile main memory 7*b* is overwritten with the current value and the point b is reached.

The window characteristics are thus loaded for k=1 though p windows, particularly FE6, or alternatively FE10 or, respectively, FE8. Subsequently, a branch is made to sub-step 4312 in order to load a new byte in sub-step 4313. The bits (dot=1) converted from the hexadecimal data are thus transferred byte-by-byte into the pixel memory area I of the volatile pixel memory 7*c* in step 43*a* shown in FIG. 9*a*, and are successively stored as binary data.

FIG. 9*b* shows the embedding of decompressed, current window data of type 1 into the decompressed frame data after the start of the postage meter machine, or the editing of frame data. Assuming that a control character for type 1 window was recognized in sub-step 4318, the point $c_1$, and thus the beginning of step 43*b*, is reached.

In sub-step 4330, the executed storing of window characteristics $T_j$ is identified. When a window characteristic, the window column run variable $T_j$ in this case, is still at the initial value 0, the window starting address $Z_j$ corresponding to the address Z is identified in a sub-step 4331 and is stored in the volatile main memory 7*b*. Otherwise, a branch is made to a sub-step 4332. The sub-step 4331 is likewise followed by the sub-step 4332 in which the window characteristic of the window column run length $T_j$ and the window column run length variable $W_j$ are set to an initial value 0 and the window source address $U_j$ is set to the initial value $U_{oj-1}$, and the second color flip flop FF2 for windows is set to "print uncolored".

In the following sub-step 4333, the previous window source address $U_j$ is incremented and a color change is carried out, so that data forming window bytes that are loaded in the following sub-step 4334 are interpreted as colored, this subsequently leading to activated printer elements during the printing.

In sub-step 4334, a byte from the sub-memory areas $B_j$ in the non-volatile main memory 5 is loaded into registers 200 of the volatile main memory 7*a* and detection for control characters is carried out.

In sub-step 4335, the window column run length $Y_j$ is incremented by the value of the window column run length variable $W_j$. A finding is made in sub-step 4336 to determine whether a control character "00" for color change is present. If such a control character "00" has been recognized, a branch is made back to sub-step 4333. Otherwise, a check is made in sub-step 4337 to see whether a control character "FE" for end of column is present. If this is not the case, window data are present. In a sub-step 4338, thus, the content of the register 200 is decoded with the assistance of the character memory 9 and the binary window pixel data corresponding to this byte are stored in the pixel memory area I of the pixel memory 7*c*.

In a sub-step 4339, the window column run length variable $W_j$ is subsequently identified in order to increment the address Z by the value of the variable $W_j$. The new address for a byte of the data set to be newly converted is thus available and a branch is made back onto sub-step 4333 in which the new source address for a byte of the data set for window FEj is also generated.

If a control character "FE" for an end of column was recognized in sub-step 4337, a branch is made to sub-step 4340 wherein the window column variable $T_j$ is incremented and the window column variable $T_j$ and the window column run length $Y_j$ stored in the volatile main memory 7*b* are overwritten with the current value. Subsequently, a color change is made in sub-step 4341 and point b has been reached.

Step 43*b* has thus been executed and new frame data can be covered in step 43*a* in case a next window is not recognized or point d has not been reached.

FIG. 9*c* shows the embedding of decompressed, variable type 1 window data into the decompressed frame data after the editing of these type 1 window data. As has already been shown, pixel memory data and window characteristics have already been stored before the beginning of step 54. The sub-step 5440 begins with the identification of that plurality n' of windows for which that data have been modified and with an identification of the relevant window start address $Z_j$ and window column variable $T_j$ for each window FEj. A window count variable q is also set to 0.

A determination is made in sub-step 5441 as to whether the value of the window count variable q has already reached a value of the window change number n'. Given no changes, i.e. n'=0, the comparison is positive and the point d is reached. Otherwise, a branch is made to sub-step 5442, wherein the window start address $Z_j$ and the window column variable $T_j$ for a first window FEj whose data were modified are taken from the volatile main memory 6*b*. Moreover, the source address $U_j$ is set to an initial value $U_{oj-1}$, the destination address $Z_j$ is employed for addressing the pixel memory area I, and a window column counter $P_j$ and the second color flip flop FF1 are reset to the initial value of zero.

The source address is incremented in the following sub-step 5443 and a color change is implemented before sub-step 5444 is reached. In sub-step 5444, one byte of the modified data set in the non-volatile memory is called in and is transferred into the register 200 of the volatile memory 7*a*, and control characters are detected. Given a control character "00" for a color change, a branch is made in sub-step 5445 back to sub-step 5443. Otherwise, a branch is made to sub-step 5446 in order to search for control characters "FE" for a column end. If such a control character is not present, the content of the register 200 can be decoded in the following sub-step 5447 with the assistance of the character memory 9 and can be converted into binary pixel data for the window to be modified. These binary pixel data then replace the pixel data previously stored in area I of the pixel memory 7*b* beginning with the location predetermined by the window start address $Z_j$. The bits converted in this manner are counted as the window run length variable $W_j$ with which the destination address $V_j$ is incremented in sub-step 5444*a*. Subsequently, a branch is made back to sub-step 5443 in order to load the next byte in sub-step 5444.

When a control character "FE" for column end is recognized in sub-step 5446, a branch is made to sub-step 5449 in which the window column counter $P_j$ is incremented.

A check is made in sub-step 5450 to determine whether the window characteristic for the relevant window column variable $T_j$ is reached by the window column counter $P_j$. All modification data for a first modified window would then be loaded into the pixel memory area I and a branch is made back to sub-step 5453, and from this sub-step 5453 to the sub-step 5441 in order to transmit modification data into the pixel memory area I for a possibly second window. In sub-step 5453, the window count variable q is incremented for this purpose and the following window start address $Z_{j+1}$ and the following window column variable $T_{i+1}$ are identified.

Otherwise, if the window column variable $T_j$ is not yet reached in sub-step 5450 by the window column counted $P_j$, a branch is made via the sub-steps 5451 and 5452 back to the sub-step 5443 in order to overwrite a further window column in the pixel memory area until the binary window pixel memory data have been completely replaced by new data. In sub-step 5451, the destination address for the data in the pixel memory area I are incremented by the frame overall column length R for this purpose. The destination address $D_j$ is thus set to the next column for binary pixel data of the window in the pixel memory area I. In sub-step 5452, the color flip flop is reset to 0, so that the conversion begins with pixel data interpreted as colored.

If a further new input is not found in step 44, the formation of new, coded window data of type 2 can now ensue in step 45 for a mark image, particularly according to a first version comprising a step 45*a*.

Figure 10:
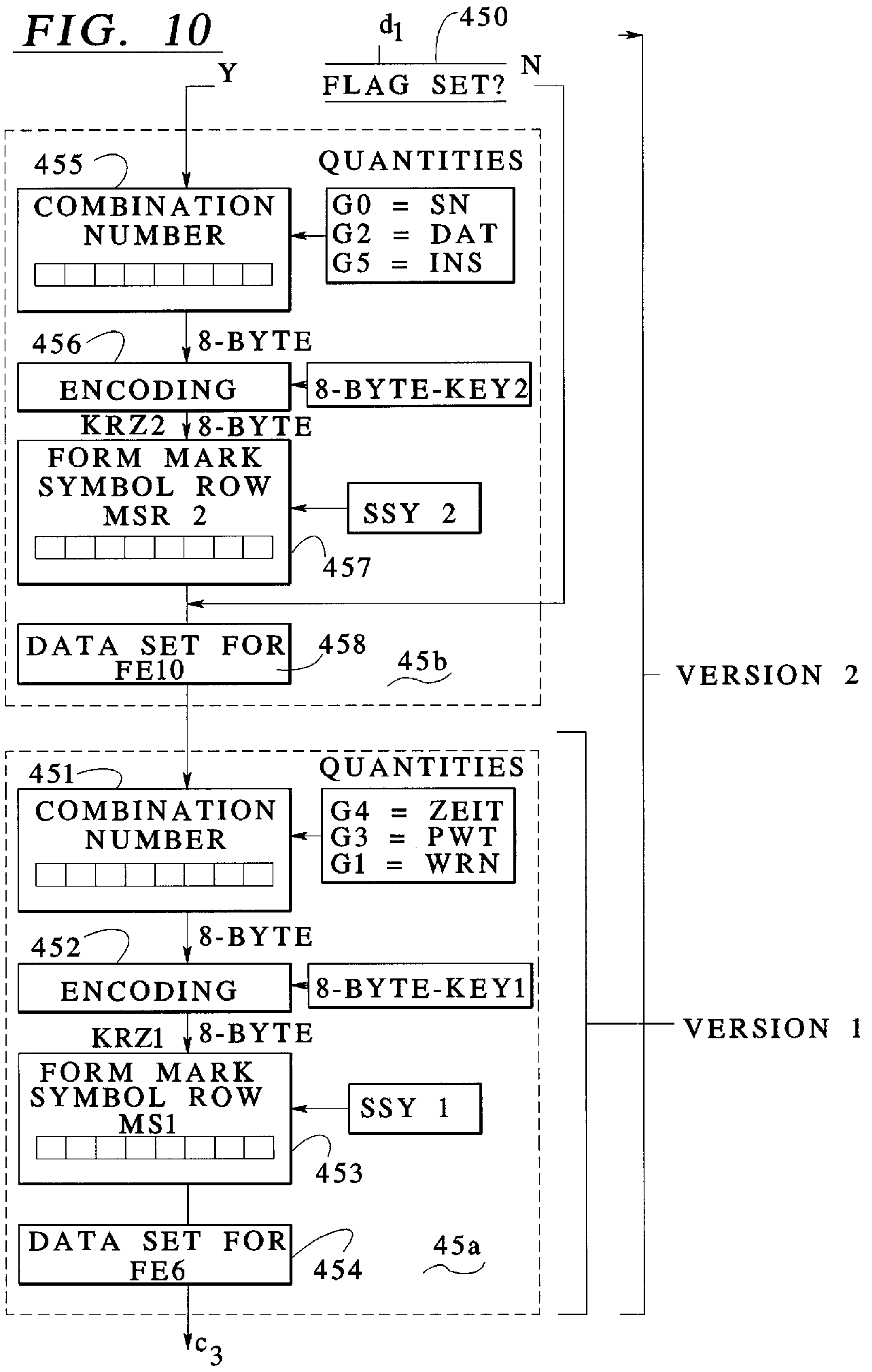
FIG. 10 is a flow chart illustrating formation of new, coded window data of type 2 for a mark image in accordance with the invention.

Step 45*a* comprises further sub-steps shown in FIG. 10 for forming a new, coded window data of type 2 for a mark image.

Whereas binary pixel data that are already decompressed are present in the pixel memory area I, the output data required for the data sets containing the compressed data for the windows FEj and possibly for the frame data, are again requested in step 45 following step 44 in order to form new, coded window data of type 2 for a mark symbol sequence. The identical output data (or input data) are stored as a BCD-packed number in the memory areas $ST_w$ according to the respective quantities $G_w$. The data sets are stored non-volatilely in the sub-memory areas $A_i$ and $B_j$. The data for a data set for windows FEk of type 2 are not combined in a plurality of steps and are also non-volatilely stored in a sub-memory area $B_k$.

A method for fast generation of a security imprint includes a step 45*a* implemented by the microprocessor of the control unit 6 of the postage meter machine before a print request (step 47) and after an offering of quantities. The step 45*a* including the following sub-steps:

a) Generating a combination number KOZ1, whereby a steadily, monotonously variable quantity G4 for the formation of first interconnected places and at least one further quantity G3 characteristic of the postal matter for forming second interconnected places of the combination number KOZ1 are made available;

b) Encoding of the combination number KOZ1 to form a cryptonumber KRZ1; and c) Converting the cryptonumber KRZ1 into at least one mark symbol sequence MSR1 on the basis of a set SSY1 of symbols.

In a first version 1, a mark symbol sequence is generated in a step 45*a*. In accordance with the invention, at least one part of the quantities is employed in the postage meter machine on the basis of the quantity of information forming the quantities G0 through G5. These quantities should only be partially openly printed unencoded in the postage meter machine imprint, in order to form a single numerical combination (sub-step 451) that is encrypted to form a single cryptonumber (sub-step 452), which is then converted into a mark to be printed on the postal matter (sub-step 453). The storing of the data set to be generated for the mark in a window FE6 can ensue in a concluding sub-step 454. Point $c_3$ has then been reached. The time that is otherwise required in the postage meter machine for generating further cryptonumbers can thus be saved by this first version implemented in sub-step 45*a*.

The steadily, monotonously variable quantity $G_w$ is at least one ascending or descending machine parameter, particularly a time count or the complement thereof during the service life of the postage meter machine.

It is advantageous that the machine parameter be time-dependent, particularly a quantity G4*a* characterizing the decreasing battery voltage of the battery-supported memory, and comprises a second, steadily, monotonously decreasing quantity G4*b* or the respective complement of the quantity G4*a* and G4*b*.

In one version the second, steadily, monotonously decreasing quantity G4*b* is the complement of the item count or a steadily, monotonously decreasing time-dependent quantity.

In another version the steadily, monotonously decreasing quantity is a numerical value corresponding to the next inspection date (INS) and a steadily, monotonously decreasing time-dependent quantity.

Another alternative is that the steadily, monotonously increasing quantity includes the date or the item count identified at the last inspection.

As has already been set forth in detail, it is advantageous when a portion of the quantities G0 or G1 characterizing the user of the postage meter machine is made available by the control unit 6 for the formation of a third group of interrelated places of the combination number KOZ1.

Preferably, the upper ten places of the combination number KOZ1 are offered from the memory areas $ST_w$ in sub-step 451 for the ZEIT data (quantity G4) and the lower four places are offered for the postal value (quantity G3). A combination number having 14 digits thus arises; this is then encoded. Given application of the DES algorithm, a maximum of eight bytes, i.e. 16 digits, can be encoded at once. The combination number KOZ1 can thus be potentially supplemented by a further quantity in the direction of the less significant places. For example, the supplementary part can be a part of the serial number SN or the number WRN of the advertising slogan frame, or can be the byte that is selected from the data set of the advertising slogan frame dependent on a further quantity.

In sub-step 452, this combination number KOZ1 can be encoded into a cryptonumber KRZ1 in approximately 201 ms, by means of a plurality of further, known steps sequence here. In accord therewith, the cryptonumber KRZ1 is to be converted in sub-step 453 into a corresponding symbol sequence on the basis of a predetermined mark list stored in the memory areas M of the non-volatile main memory 5. In An increased information density can thereby be achieved.

Even if a set—shown in FIG. 3*f*—having ten symbols is employed, i.e. without an increase in the information density compared to the cryptonumber KRZ1, but two mark rows (next to one another or, respectively, below one another) were to be printed, further symbols could remain, by means of which further information could be presented unencoded or encoded. The further information is preferably information that does not change or that minimally change and only have to be encoded once and converted once into a symbol sequence. This is preferably a matter of the quantity of the G5, i.e. inspection data (INS), for example, the date of the last inspection or the remainder of the serial number SN, or the serial number SN itself, and the byte of the data set of the advertising slogan frame that was not involved in the first combination number KOZ1, or selected, predetermined parts thereof. Respective rows having a total of 20 symbols are imaged in FIG. 3 in windows FE6 and FE10 are arranged orthogonally relative to one another, with which, for example, the total of eight bytes, i.e. 16 digits of the cryptonumber KRZ1 and further information can be forwarded uncoded, or encoded in some other way.

A second version including a step 45*b* in addition to the step 45*a* differs from the first version on the basis of different output or input quantities that, however, are to be identically taken into consideration. In the second version, a mark symbol sequence is successfully generated in two steps 45*b* and 45*a*, whereby the step 45*b* is implemented analogously to the step 45*a*.

In a first sub-step 450 of the step 45 implemented by the control unit 6, a check is made to determine whether a flag was set in order to initiate the implementation of sub-steps 45*b* and/or 45*a*, a second combination number KOZ2 comprising at least the other part of the quantity G0, G1 characterizing the user of the postage meter machine is formed in the sub-step 45*b*, is subsequently encoded to form a second cryptonumber KRZ2, and is then converted into at least one second mark symbol sequence MSR2 on the basis of a second set SSYQ of symbols.

Compared to sub-stp 451, a combination number KOZ2 is formed in sub-step 455, such as from the quantities of the remaining parts of the serial number SN, for advertising slogan (frame) number, and other quantities. As in sub-step 452, a cryptonumber KOZ2 is formed in sub-step 456. The transformation into a mark symbol sequence then again ensues in sub-step 457, this being in intermediately stored in non-volatile fashion in sub-step 458.

Subsequently, the step 45*a* comprising the sub-steps 451 through 453 is executed. This can potentially be terminated by a sub-step 454. Point $c_3$ is subsequently reached.

Despite a two-time application of the DES algorithm, a time-saving nonetheless arises due to an evaluation in a first sub-step 450 to determine whether the selected quantities required for the formation of the mark symbol sequence in sub-step 45*b* have been modified by an input. Given a re-input of selected, specific quantities, a flag would be set in step 44 and would be taken into consideration in a following formation of data for a new mark symbol sequence in order to execute step 45*b*. If, however, this is not the case, then a mark symbol sequence, or parts of the mark symbol sequence stored in a memory area 458 in non-volatile fashion and already formed earlier can then be accessed.

In a modified embodiment, an encoding algorithm other than the DES is employed for saving time in sub-step 456.

In an advantageous embodiment, a transformation is undertaken in the sub-step 453 of the first version, or in the sub-step 457 of the second version, for additionally increasing the information density of the mark symbol sequence compared to the cryptonumber KRZ1 or KRZ2. For example, a set of 22 symbols is now employed given an cryptonumber having 16 digits, in order to form the information with only 12 digits—in the way shown in FIG. 3*b*. The mark symbol sequence shown in FIG. 3*b* is to be doubled for two cryptonumbers. This can occur with a further mark symbol sequence that lies parallel to the mark symbol sequence shown in FIG. 3*b*.

Correspondingly, it can also be shown that only a symbol set comprising 14 symbols is required for a mark symbol sequence having 14 digits. The inspection by the postal authority of mailings having such mark symbol sequences which was already set forth above can consequently ensue according to the second evaluation version on the basis of a back-transformation of the mark symbol sequence into cryptonumbers KRZ1, (and possibly KRZ2), their subsequent decoding to form combination numbers KOZ1, (and KOZ2) whose individual quantities are compared to the quantities openly printed in the franking image on the postal matter.

A mark symbol sequence as was shown in FIG. 3*a* is designed for ten digits and can image a cryptonumber KRZ1 if the symbol set comprises forty symbols. A fully automated input and evaluation is preferable—if only to avoid subjective errors by the inspector in the recognition of the symbols.

In a step following step 45, the data of a data set for the mark symbol sequence are then embedded into the remaining pixel data after they have been decompressed. In particular, two different possibilities are inventively provided for this purpose. One possibility shall be set forth in greater detail with reference to 11 and the other shall be set forth in greater detail with reference to FIG. 13.

Figure 11:
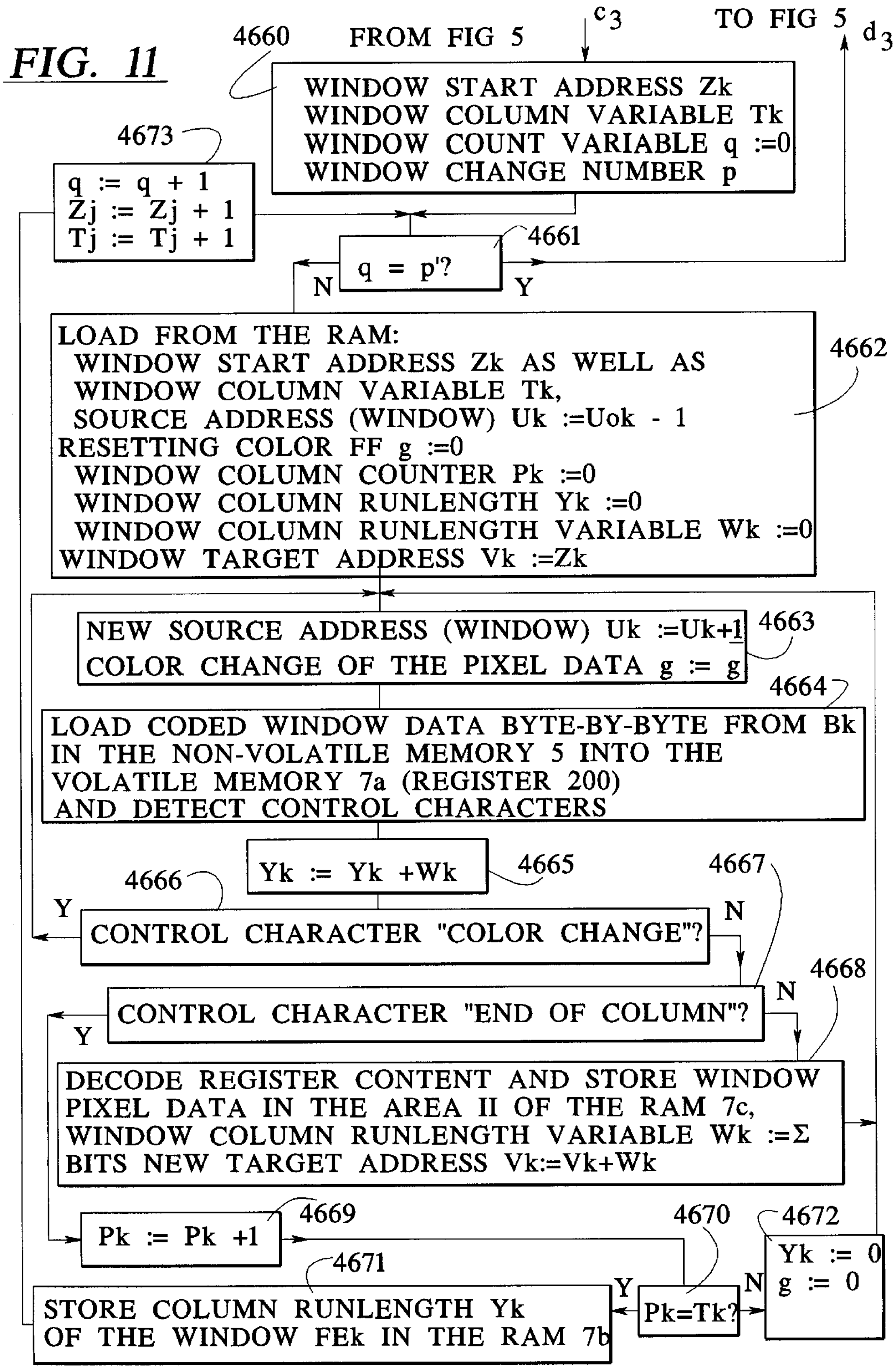
FIG. 11 is a flow chart illustrating decoding of control code and conversion into decompressed, binary window data of type 2 in accordance with the invention.

Step 46 of FIG. 5 is particularly set forth in FIG. 11. In a sub-step 4660, window characteristics $Z_k$ and $T_k$ are prescribed for modified window data, the window modification number p' is identified, and a window count variable q is set equal to 0. An evaluation is made in sub-step 4661 to determine whether the window count variable q is equal to the window modification number p'. The point $d_3$ and thus the next step 47 would then already have been reached. This loop, however, is usually not yet begun at the start since the monotonously ascending quantity constantly generates new mark symbol sequences for every imprint.

Otherwise, if a modification has ensued, a branch is made to sub-step 4662 in order to enter window characteristics corresponding to the modified windows and in order to set initial conditions.

In a sub-step 4663, a new source address for the data of the data set of the window FEk being processed at the moment is generated in order to load a byte of the coded window data of type 2 from the memory area $B_k$ into the register of the non-volatile memory 7*a* in the next sub-step 4664 and in order to detect control characters.

In a sub-step 4665, the window column run length $Y_k$ is then incremented by the window column run length variable $W_k$; this is still zero here. After this, a check is made for control characters for color change (sub-step 4666) and a branch is potentially made back to sub-step 4663 or a search is made for control characters indicating column end (sub-step 4667). Given a successful outcome of this search, a branch is made to sub-step 4669 and the window column counter $P_k$ is incremented. Otherwise, a decoding of the control code and a conversion of the called-in bytes into decompressed, binary window pixel data of type 2 are undertaken in the next sub-step 4668.

A check is made in sub-step 4670 to determine if all columns of the window have been processed. When this is the case, a branch is made to sub-step 4671 and the column run length $Y_k$ of the window FEk is stored in the memory 7*b* and a branch is made back to sub-step 4673.

If it is found in sub-step 4670 that all columns have not yet been processed, a branch is made back to sub-step 4663 via the sub-step 4672, whereby the window characteristic Yk and the color flip flop are reset to 0. In the next sub-step 4668, a decoding of the control code and a conversion of the called-in byte into decompressed, binary window pixel data of type 2 are undertaken again, if necessary.

After the sub-step 4673, wherein the characteristics of the next, modified window are called in, a branch is again made to sub-step 4661. When all modification windows have been processed, point $d_3$ has been reached.

The printing routine for the combination of data from the pixel memory areas I and II shown in FIG. 12 sequences when a print request is recognized in step 47 and data have been loaded in a sub-step 471, which is not shown in FIG. 5.

In sub-step 471, the end address $Z_{end}$ is loaded, the running address Z (running variable) is set to the value of the source address $Z_0$ in area I of the pixel memory area 7*c*, the window column counted $P_k$ is set to the respective value corresponding to the stored window column variable $T_k$, the window bit count lengths $X_k$ are set to the respective value corresponding to the stored window column run length $Y_k$, and the destination addresses $Z_k$ for k=p windows as well as the overall run length R for a print column $s_k$ are loaded. The print column comprises N print elements.

Subsequently, when the point $e_1$ is reached at the start of step 48, a number of sub-step sequence. Thus, the register 15 of the printer control 14 is serially loaded with binary print column data in a sub-step 481 bit-by-bit from the area I of the pixel memory area 7*c*, these binary print column data being called in with the address Z, and the widow counter h is set to a number that corresponds to the window number p incremented by one. In sub-step 482, a window counter h is decremented. This window counter h successively generates window numbers k, whereupon the address Z reached in the pixel memory is compared in the sub-step 483 to the window start address $Z_k$ of the window $FE_k$. When the comparison is positive and a window start address is reached, a branch is made to sub-step 489 which is in turn composed of the sub-steps 4891 through 4895. Otherwise, a branch is made to sub-step 484.

In sub-step 4891, a first bit from the area II of the pixel memory 7*c* for the window $FE_k$ and the binary window pixel data are serially loaded into the register 15, whereby the address Z and the bit count variable are incremented 1 in sub-step 4892 and the window bit count length $X_k$ is decremented. Further bits are loaded from the area II in a sub-step 4893 if all bits corresponding to the window column run length $Y_k$ have not yet been loaded. Otherwise, a branch is made to sub-step 4894, whereby the window start address $Z_k$ for the addressing of the next window column is correspondingly incremented by the overall length R and the window column counter $P_k$ is decremented. Simultaneously, the original window bit count length $X_k$ is restored corresponding to the window column run length $Y_k$.

A check is then carried out in sub-step 4895 to determine whether all window columns have been processed. When this is the case, the start address $Z_k$ for the corresponding window $FE_k$ is set to 0 or an address which lies outside the pixel memory area I. Otherwise and following sub-step 4896, a branch is made to point $e_1$.

A check is carried out in sub-step 484 to determine whether all window start addresses have been interrogated. When this has occurred, then a branch is made to sub-step 485 in order to increment the running address Z. When this has not yet ensued, a branch is made back to sub-step 481 in order to continue to decrement the window counter h until the next window start address is found or until the window counter h becomes equal to zero in sub-step 484.

A check is carried out in sub-step 486 to determine whether all data for the column $s_k$ to be printed have been loaded in the register 15. If this is not yet the case, then the bit count variable is incremented 1 in sub-step 488 in order to return to the point $e_1$ and in order then to load the next bit addressed with the address Z from the pixel memory area into the register 15 in the sub-step 481.

When, however, the register 15 is full, then the column is printed in sub-step 487. In a step 50 already illustrated in FIG. 5, a determination is subsequently made as to whether all pixel data of the pixel memory areas I and II have been printed out, i.e. the mailing has been completely franked. When this is the case, then point $f_1$ is reached. Otherwise, a branch is made to sub-step 501 and the bit count variable 1 is reset to 0 in order to subsequently to branch back to point $e_1$. The next print column can now be produced.

The printing routine for the combination of data taken from only one pixel memory area I and from main memory areas shall be set forth in greater detail with reference to FIG. 13. After a print request, which is determined in step 47 shown in FIG. 6, a sub-step 471 immediately ensues, as already set forth in conjunction with FIG. 12, in order to reach the point $e_2$. The step 49 which now begins—which was already shown in FIG. 6—includes the sub-steps 491 through 497 and the sub-step 4990 through 4999. The sub-steps 491 through 497 sequence with the same result in the same sequence as the sub-steps 481 through 487 that were already set forth in conjunction with FIG. 12. Only in sub-step 493 is a branch made to the sub-stp 4990 in order to reset a color flip flop to g:=0, whereupon the procedure already set forth in conjunction with FIG. 6 of the print column-by-print column decompression of the coded window data of type 2 is initiated with sub-step 491. A color change in the evaluation of the window pixel data of type 2 to be converted which was already set forth in conjunction with FIG. 7 ensues here, so that the first hexadecimal data of the data set that is called in are evaluated, for example, as colored. The source address is incremented. This is subsequently followed by the loading of the compressed window data for the windows $FE_k$ of type 2, particularly for the mark data, from the predetermined data set (stored in the corresponding sub-memory areas $B_j$) into the registers 200 of the volatile main memory 7*a* in sub-step 4992. A hexadecimal number "QQ" thereby corresponds to one byte.

The control code is also detected. When a window column is to be printed that beings with non-colored pixels, i.e., with pixels that are not to be printed, a control code "color change" would reside at the first location in the data set. In sub-step 4993, a branch is thus made back to sub-step 4991 in order to carry out the color change. Otherwise, a branch is made to sub-step 4994. A determination is made in sub-step 4994 as to whether a control code "column end" is present. If this is not yet the case, then the register content must be decoded, and thus must be compressed. A series of binary pixel data exists in the character memory 9 for each run time-coded hexadecimal numerical value; this series can correspondingly be called in on the basis of the hexadecimal number loaded in the volatile main memory 7*a*. This ensues in sub-step 4995, whereby the decompressed window pixel data for a column of the windows $FE_j$ of type 2 are subsequently serially loaded into the print register 15 of the printer control 14.

In sub-step 4996, the address is then incremented and a corresponding next hexadecimal number in the data set is selected, this being stored in the sub-area $B_5$ in the non-volatile main memory 5, and the bits converted in the decoding of the run length coding are identified in order to form a window column run length $W_j$ with which the destination address is incremented. The new destination address for the read-in has thus been generated and a branch can be undertaken back to sub-step 4991.

When the column end has been reached, sub-steps 4997 through 4999 follow in order subsequently to return to point $e_2$. The sub-steps 4998 and 4999 sequence similar to the sub-steps 4895 and 4984 shown in FIG. 12.

In sub-step 497, the completely loaded print column is printed. The sub-steps 491 through 497 sequence similar to the sub-steps 481 through 487 shown in FIG. 12.

In addition to a low mechanical outlay, a high printing speed is achieved with a plurality of variable print format data to be embedded into a stored, fixed print format.

In a further version of the method for generating a security imprint for postage meter machines, a printer module applies a franking image that is generated in a fully electronic way onto a mailing, in accord with the current inputs or, respectively, data actuated via an input means and an input/output control module, a display unit being capable of being checked therewith. For this purpose the data for the constant parts of the franking image, which relate at least to the frame of an advertising imprint, are stored in a first memory area $A_i$ of the program memory 11. The non-volatile memory 5 has a number of memory areas, and the data for the variable or semi-variable parts of the franking image are respectively stored in second memory areas $B_k$ or $B_j$ of the non-volatile memory 5. The names of the advertising imprint frames can be allocated to the selectable cost center numbers for the cost centers in a third memory area C of the non-volatile memory 5. Advertising imprint frame numbers WRN correspond to the names of the advertising imprint frames.

The printed pattern is generated from fixed data and current data with the microprocessor-controlled printing process and the printer controller. Data corresponding to the name or to the advertising imprint frame number WRN that are present stored in memory areas of the non-volatile memory 5 and identify the currently set frame of an advertising imprint. Frame data are taken from the first memory area of the program memory 11, are decompressed and are stored in a first area I of a pixel memory 7C. Semi-variable window data from the second memory area $B_j$ are subsequently embedded into the aforementioned constant data. Before printing, a debiting under the aforementioned cost center number is undertaken in a sub-step 470 in the cost center memory 10 in the case of a print request 47, and variable window data from the second memory area $B_k$ for the marking data are subsequently embedded during printing, whereby the embedding ensues during the loading of the print register 15.

In particular, the advantageous embodiments have been set forth in greater detail, whereby, given a faster hardware, it is possible to modify the sequence of the method steps in order to likewise quickly generate a security imprint.

When, in step 47, an advance is made to the step 48 or 49 containing a printing routine and, if a print request that has not yet ensued a wait ensues for the print request in a waiting loop by making a direct return to the start of step 47—in the way shown in FIGS. 5 or 6—. The postage meter machine of the invention has a further time advantage since cryptonumbers need not permanently be regenerated according to the DES algorithm. The next acquirable point in time after a generation of the row of marking symbols can already trigger the printing. Nonetheless, other returns are also possible, as mentioned. An additional step 61 can chronologically precede the step 47 in order, given the identification of the absence of a print request in step 61, to cause a branch to a standby mode (step 62), for example in order to display the current time of day and/or date and/or in order to automatically implement error checks. A branch from the standby mode 62 is in turn made directly to the starting step 40 or indirectly via further steps or modes.

In another version, the step 45 can be placed between the steps 53 and 54. In step 54 following step 45, the data of a data set for the mark symbol sequence—after they are decompressed—are then embedded into the remaining pixel data of the pixel memory area I. A further pixel memory area is then not required.

Another version only stores the frame pixel data in the pixel memory area and embeds all window pixel data immediately into the corresponding columns read into the print register 15 without requiring a pixel memory for window data in-between.

In one version without automatic editing of slogan text parts, the memory area $A_i$ can be foregone. Instead, the invariable image information is stored in a read-only memory, for example in the program memory 11. In the decoding of the invariable image information, this read-only memory 11 is accessed, so that the intermediate storage can be eliminated.

The program memory 11 is connected to the control unit 6, with the data for the constant parts of the franking image that are directed at least to one advertising imprint frame being stored in a first memory area $A_i$. An allocated name identifies the advertising imprint frame. The non-volatile main memory 5 is connected to the control unit 6, with the data for the semi-variable parts of the franking image being stored in the second memory area $B_j$ and an allocated name identifies the semi-variable part. A first allocation of the names of the semi-variable parts to the names of the constant parts exists corresponding to the stored program. A second allocation is undertaken according to the cost center number stored in a third memory area C, so that an advertising imprint can be selectively allocated to each cost center KST. A microprocessor is provided in the control unit 6 in order to implement an encoding to form marking pixel image data before they are embedded column-by-column into the remaining pixel image data. A volatile main memory 7, a print controller 14 having a print register 15 are therefore connected to the microprocessor, with which the marking pixel image data are inserted into the remaining fixed and variable pixel image data during printing under the control of the microprocessor and corresponding to a program stored in the program memory 11.

Figure 14:
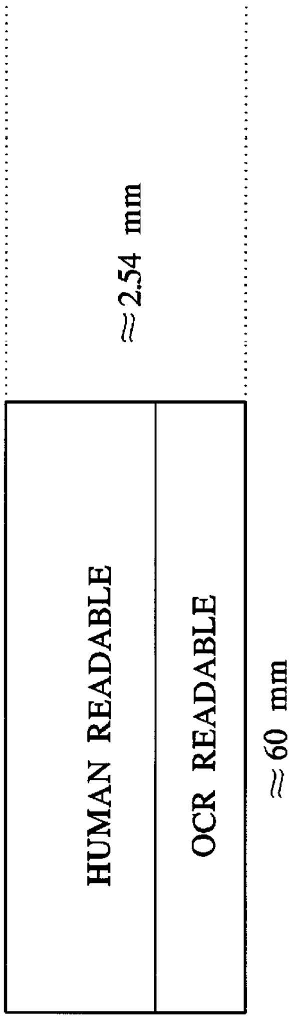
FIG. 14 shows a general format of a further version of a franking indicium printed in accordance with the invention.

Recently the USPS has requested meter manufacturers to provide proposals for two alternative imprint possibilities, either printing the franking indicium with fluorescent ink or using an FIM code together with the indicium. The indicium area will be subdivided into two parts, as shown in FIG. 14. These include a human readable part, such as in an upper portion of the indicium, and an OCR (Optical Character Reader) readable area, such as in a lower part of the indicium. The total dimensions of the indicium cannot exceed 60 mm×2.54 mm (1 inch).

The human readable area of the indicium will contain the following items:

| # | Information | Type | Example |
|---|---|---|---|
| 1. | Date of mailing | numeric | 11-21-1966 (MM-DD-YYYY) |
| 2. | Postage | numeric | $00.32^{5}$ |
| 3. | Vendor ID | alpha | Francotyp-Postalia |
| 4. | Machine ID | numeric | 1234567 |
| 5. | Originating ZIP | alpha | MERRIFIELD VA |

The OCR-readable portion will contain security data, such as OCR-readable digits, such as the following example:

11234567064841121

96003252222212345

The OCR-readable area contains the following items:

| # | Information | count | example | lifetime |
|---|---|---|---|---|
| 1. | Vendor Id | 1 | 1 | constant |
| 2. | Device Id | 7 | 1234567 | constant |
| 3. | Origin ZIP | 5 | 06484 | constant |
| 4. | Date | 6 | 112196 | semiconstant |
| 5. | Postage Amount | 5 | 00325 | semiconstant |
| 6. | Piece Count | 5 | 22222 | variable |
| 7. | MAC | 5 | 12345 | variable |
| | Sum | 34 | | |

Figure 15:
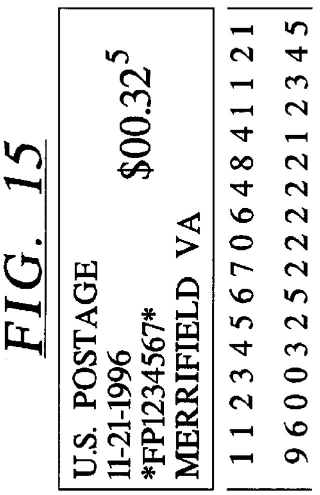
FIG. 15 illustrates more details of the general format of the franking indicium shown in FIG. 14.

As noted above, the OCR-readable area will occupy the lower portion of the indicium. For better machine readability, it is preferable to flank the OCR-readable area by lateral marking stripes, as shown in FIG. 15 wherein the above-noted example of OCR-readable digits are shown in the lower portion of the indicium with vertical lines at each end thereof. FIG. 15 also show more details of the information contained in the upper-human-readable area.

As noted above, the USPS has recently issued requirements either to print the franking indicium using fluorescent ink, or to print an FIM mark along with the indicium using black ink.

Figure 16:
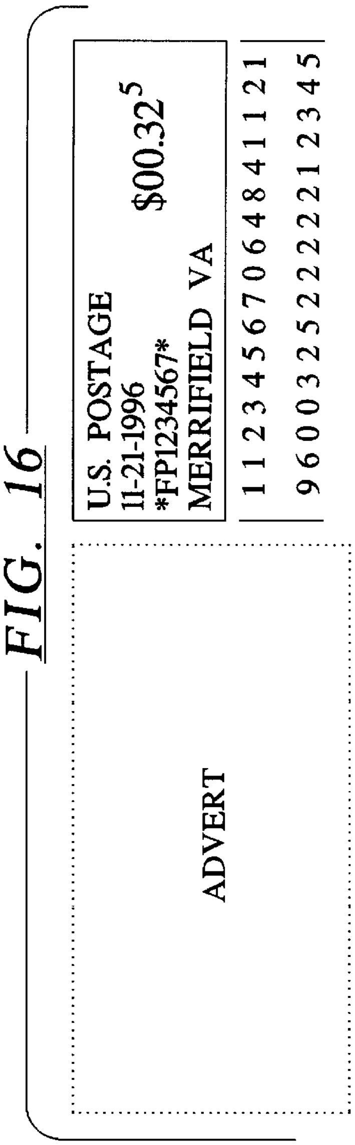
FIG. 16 shows the franking indicium of FIG. 15, with an FIM mark and an advertisement block appended thereto.

FIG. 16 shows a sample format of an imprint including three areas: The franking indicium (using the indicium of FIG. 15 as an example), and advertising block ADVERT, and an FIM mark in between. The ink color is preferably black in order to achieve a higher scanning quality.

The FIM mark is defined in the Domestic Mail Manual of the USPS as follows. The top of the FIM must be within ⅛ inch of the edge of the envelope, and may extend to the edge. The width of the entire FIM area shall be 1¼ inches (32 mm), and the height shall be ⅝ inch (15.9 mm).

Figure 17:
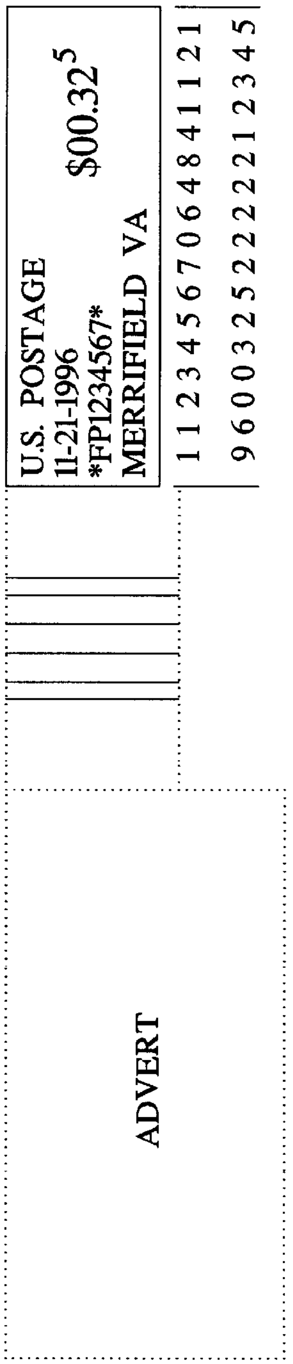
FIG. 17 shows another version of the franking indicium of FIG. 15, with an advertising block appended thereto.

FIG. 17 shows an example of an imprint format including only the franking indicium (again using the indicium of FIG. 15 as an example) and an advertising block ADVERT. In this version, the ink is fluorescent and is preferably of a color other than red for better machine readability. Since black shades have a low fluorescent emittance, preferably blue or brown fluorescent ink is used in printing an imprint such as shown in FIG. 17.

As described above, a message authentication code (MAC) is a key-dependent, one-way function. A cryptographic data authentication algorithm (DAA) can protect against accidental and intentional, but unauthorized, data modification. A data authentication code (DAC) is generated by applying the DAA to data as described below. The DAC is a mathematical function of both the data and a cryptographic key.

The DAA described herein uses the data encryption standard (DES) cryptographic algorithm specified in FIPS PUB 113 (Federal Information Processing Standards Publication). The DES algorithm transforms (or encrypts) 64-bit input vectors to 64-bit output vectors using a cryptographic key. As an example, let D be any 64-bit input vector, and assume that a key has been selected. Then the 64-bit output vector O, which is the output of the DES algorithm applied to D using the enciphering operation, is represented as follows:

O=ENCRYPT (D)

The data are authenticated by grouping the data into contiguous 64-bit blocks: D1, D2, . . . Dn. If the number of data bits is not an even multiple of 64, then the final block will be a partial block of data, left-justified with appended zeros so as to form a full 64-bit block. The calculation of the DAC is represented by the following equations, wherein $\oplus$ represents an exclusive-OR operation on two vectors.

$$01=\text{ENCRYPT}\ (D1)$$

$$02=\text{ENCRYPT}\ (D2\oplus 01){:}0n=\text{ENCRYPT}\ (Dn\oplus 0n-1)$$

The DAC is selected from 0n, with the leftmost 16 bits of 0n being selected as the DAC.

Figure 18:
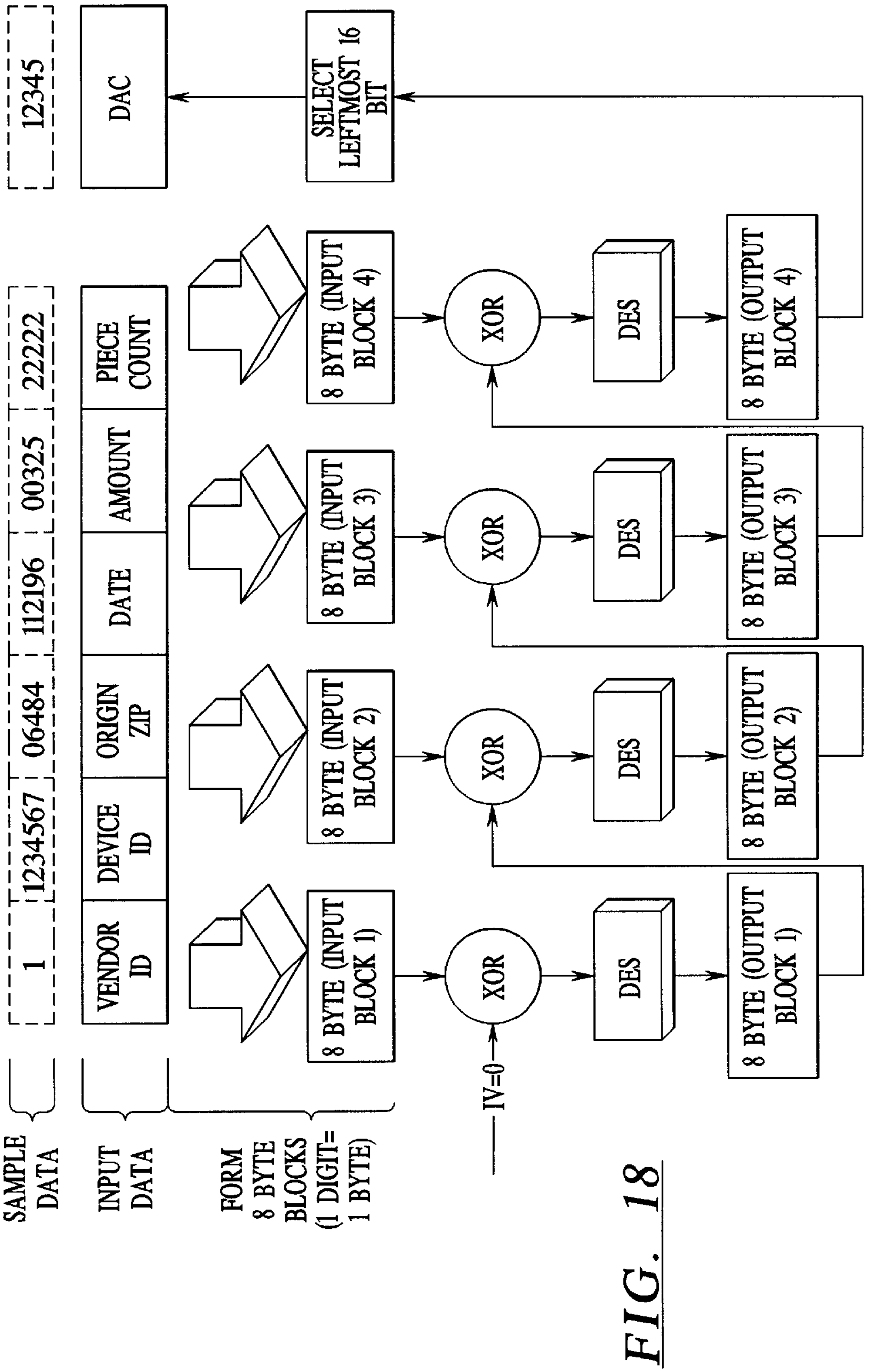
FIG. 18 is a flowchart showing a DAC (Data Authentication Code) computation in accordance with the invention.
Figure 19:
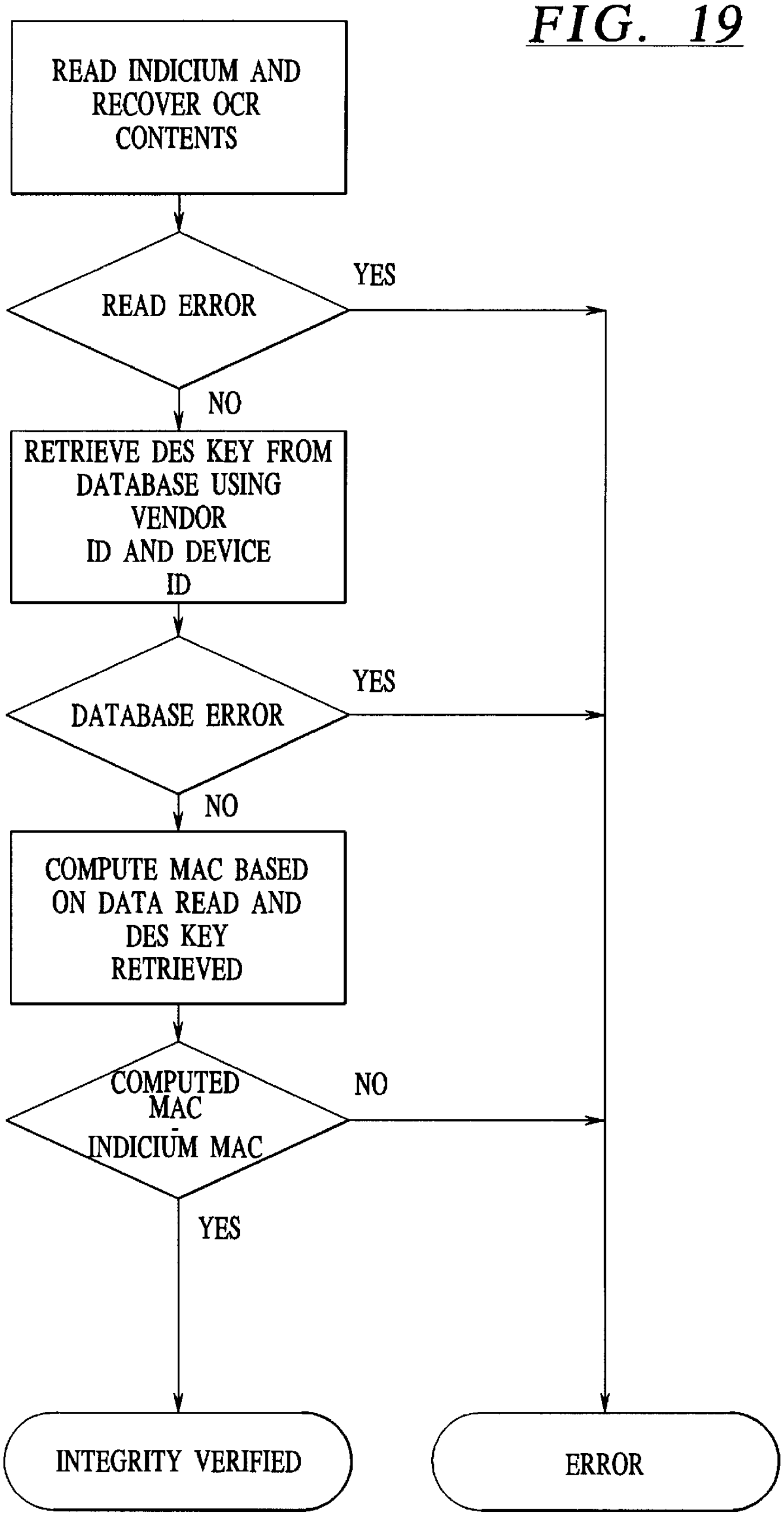
FIG. 19 is a flowchart showing a verification process for an OCR (Optical Character Reader) indicium verification in accordance with the invention.

The cipher block chaining mode (CBC) with an initialization vector (IV) equal to zero yields the required DAC calculation. FIG. 18 shows an example of DAC computation.

It is also necessary to conduct a verification of the OCR indicium. The verification process includes the steps of reading the indicium and recovering the data in the OCR area, and, in a verification unit, extracting the vendor ID and the device ID, and performing a data base search to retrieve the associated DES key. The integrity of the data must then be verified. For this purpose, the DAC is generated using the current data, and is compared with the previously generated DAC found in the indicium. If the comparison result is positive, the integrity (i.e., the authenticity) of the data is verified. FIG. 11 is a flowchart showing this OCR indicium verification.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for verifying data formed by a plurality of characters in an indicium comprising characters readable by an optical character reader, comprising the steps of:

reading characters in an indicium using an optical character reader;

retrieving a DES key from a database using a vendor identifier and a device identifier;

computing a MAC dependent on said characters read by said optical character reader and said DES key;

identifying an MAC from the characters read by said optical character reader;

comparing the computed MAC with the MAC read from said indicium; and acknowledging validity of said indicium given identity of the computed MAC and the MAC obtained from the indicium.

* * * * *